US007474690B2

(12) United States Patent
Narayan et al.

(10) Patent No.: US 7,474,690 B2
(45) Date of Patent: Jan. 6, 2009

(54) SYSTEMS AND METHODS FOR PARALLEL SIGNAL CANCELLATION

(75) Inventors: Anand P. Narayan, Boulder, CO (US); Eric S. Olson, Boulder, CO (US)

(73) Assignee: TENSORCOMM, Inc, Greenwood Village, CO (US)

( * ) Notice: Subject to any disclaimer, the term of this patent is extended or adjusted under 35 U.S.C. 154(b) by 765 days.

(21) Appl. No.: 10/935,669

(22) Filed: Sep. 7, 2004

(65) Prior Publication Data
US 2005/0031023 A1 Feb. 10, 2005

Related U.S. Application Data

(63) Continuation-in-part of application No. 10/773,777, filed on Feb. 6, 2004, now Pat. No. 7,394,879, and a continuation-in-part of application No. 10/763,346, filed on Jan. 23, 2004, now Pat. No. 7,039,136, and a continuation-in-part of application No. 10/699,360, filed on Oct. 31, 2003, and a continuation-in-part of application No. 10/686,828, filed on Oct. 15, 2003, and a continuation-in-part of application No. 10/686,829, filed on Oct. 15, 2003, and a continuation-in-part of application No. 10/686,359, filed on Oct. 15, 2003, now Pat. No. 7,068,706, and a continuation-in-part of application No. 10/669,954, filed on Sep. 23, 2003, and a continuation-in-part of application No. 10/294,834, filed on Nov. 15, 2002, now Pat. No. 7,200,183.

(60) Provisional application No. 60/445,243, filed on Feb. 6, 2003.

(51) Int. Cl.
*H04B 1/00* (2006.01)
(52) U.S. Cl. ........................ 375/148; 375/136
(58) Field of Classification Search ................ 375/130, 375/136, 143, 146, 147, 148
See application file for complete search history.

(56) References Cited

U.S. PATENT DOCUMENTS 3,742,201 A 6/1973 Groginsky (Continued)

FOREIGN PATENT DOCUMENTS

DE 4201439 A1 7/1993

(Continued)

OTHER PUBLICATIONS

Mitra, et al., Adaptive Decorrelating Detectors for CDMA Systems, Accepted for Wireless Communications Journal; Accepted May 1995.

(Continued)

*Primary Examiner*—Emmanuel Bayard
(74) *Attorney, Agent, or Firm*—Anand P. Narayan

(57) ABSTRACT

The present invention provides systems and methods for parallel interference suppression. A processing engine is used to substantially cancel a plurality of signal paths and selected channel(s) of these signal paths interfering with a selected signal. The processing engine includes a plurality of matrix generators that are used to generate matrices with each matrix comprising elements of one or more of the interfering signal paths and channels selected for cancellation. The processing engine also includes one or more processors for processing the matrices to generate cancellation operators. A plurality of applicators applies the cancellation operators to parallel input signals to substantially cancel the interfering signal from each input signal. These input signals may include received signals and/or reference codes. The embodiments disclosed herein may be particularly advantageous to systems employing CDMA (e.g., such as cdmaOne and cdma2000), Wideband CDMA, Broadband CDMA, UMTS and Global Positioning System ("GPS") signals.

96 Claims, 7 Drawing Sheets

U.S. PATENT DOCUMENTS

| | | |
|---|---|---|
| 4,088,955 A | 5/1978 | Baghdady |
| 4,309,769 A | 1/1982 | Taylor, Jr. |
| 4,359,738 A | 11/1982 | Lewis |
| 4,601,046 A | 7/1986 | Halpern |
| 4,665,401 A | 5/1987 | Garrard et al. |
| 4,670,885 A | 6/1987 | Parl et al. |
| 4,713,794 A | 12/1987 | Byington et al. |
| 4,780,885 A | 10/1988 | Paul et al. |
| 4,856,025 A | 8/1989 | Takai |
| 4,893,316 A | 1/1990 | Janc et al. |
| 4,922,506 A | 5/1990 | McCallister et al. |
| 4,933,639 A | 6/1990 | Barker |
| 4,965,732 A | 10/1990 | Roy, III et al. |
| 5,017,929 A | 5/1991 | Tsuda |
| 5,099,493 A | 3/1992 | Zeger et al. |
| 5,105,435 A | 4/1992 | Stilwell |
| 5,109,390 A | 4/1992 | Gilhousen et al. |
| 5,119,401 A | 6/1992 | Tsujimoto |
| 5,136,296 A | 8/1992 | Roettger et al. |
| 5,151,919 A | 9/1992 | Dent |
| 5,218,359 A | 6/1993 | Minamisono |
| 5,218,619 A | 6/1993 | Dent |
| 5,220,687 A | 6/1993 | Ichikawa et al. |
| 5,224,122 A | 6/1993 | Bruckert |
| 5,237,586 A | 8/1993 | Bottomley |
| 5,263,191 A | 11/1993 | Dickerson |
| 5,280,472 A | 1/1994 | Gilhousen et al. |
| 5,305,349 A | 4/1994 | Dent |
| 5,325,394 A | 6/1994 | Bruckert |
| 5,343,493 A | 8/1994 | Karimullah |
| 5,343,496 A | 8/1994 | Honig et al. |
| 5,347,535 A | 9/1994 | Karasawa et al. |
| 5,353,302 A | 10/1994 | Bi |
| 5,377,183 A | 12/1994 | Dent |
| 5,386,202 A | 1/1995 | Cochran et al. |
| 5,390,207 A | 2/1995 | Fenton et al. |
| 5,394,110 A | 2/1995 | Mizoguchi |
| 5,396,256 A | 3/1995 | Chiba et al. |
| 5,437,055 A | 7/1995 | Wheatley, III |
| 5,440,265 A | 8/1995 | Cochran et al. |
| 5,448,600 A | 9/1995 | Lucas |
| 5,481,570 A | 1/1996 | Winters |
| 5,506,865 A | 4/1996 | Weaver, Jr. |
| 5,513,176 A | 4/1996 | Dean et al. |
| 5,533,011 A | 7/1996 | Dean et al. |
| 5,553,098 A | 9/1996 | Cochran et al. |
| 5,602,833 A | 2/1997 | Zehavi |
| 5,644,592 A | 7/1997 | Divsalar |
| 5,736,964 A | 4/1998 | Ghosh et al. |
| 5,787,130 A | 7/1998 | Kotzin et al. |
| 5,844,521 A | 12/1998 | Stephens et al. |
| 5,859,613 A | 1/1999 | Otto |
| 5,872,540 A | 2/1999 | Casabona |
| 5,872,776 A | 2/1999 | Yang |
| 5,894,500 A | 4/1999 | Bruckert et al. |
| 5,926,761 A | 7/1999 | Reed et al. |
| 5,930,229 A | 7/1999 | Yoshida et al. |
| 5,953,369 A | 9/1999 | Suzuki |
| 5,978,413 A | 11/1999 | Bender |
| 5,995,499 A | 11/1999 | Hottinen et al. |
| 6,002,727 A | 12/1999 | Uesugi |
| 6,014,373 A | 1/2000 | Schilling et al. |
| 6,018,317 A | 1/2000 | Dogan et al. |
| 6,032,056 A | 2/2000 | Reudink |
| 6,088,383 A | 7/2000 | Suzuki et al. |
| 6,101,385 A | 8/2000 | Monte et al. |
| 6,104,712 A | 8/2000 | Robert et al. |
| 6,115,409 A | 9/2000 | Upadhyay et al. |
| 6,127,973 A | 10/2000 | Choi et al. |
| 6,131,013 A | 10/2000 | Bergstrom et al. |
| 6,137,788 A | 10/2000 | Sawahashi et al. |
| 6,141,332 A | 10/2000 | Lavaen |
| 6,154,443 A | 11/2000 | Huang et al. |
| 6,157,685 A | 12/2000 | Tanaka et al. |
| 6,157,842 A | 12/2000 | Karlsson et al. |
| 6,157,847 A | 12/2000 | Buehrer et al. |
| 6,163,696 A | 12/2000 | Bi et al. |
| 6,166,690 A | 12/2000 | Lin et al. |
| 6,172,969 B1 | 1/2001 | Kawakami et al. |
| 6,175,587 B1 | 1/2001 | Madhow et al. |
| 6,192,067 B1 | 2/2001 | Toda et al. |
| 6,201,799 B1 | 3/2001 | Huang et al. |
| 6,215,812 B1 | 4/2001 | Young et al. |
| 6,219,376 B1 | 4/2001 | Zhodzishsky et al. |
| 6,222,828 B1 | 4/2001 | Ohlson et al. |
| 6,230,180 B1 | 5/2001 | Mohamed |
| 6,233,229 B1 | 5/2001 | Ranta et al. |
| 6,233,459 B1 | 5/2001 | Sullivan et al. |
| 6,240,124 B1 | 5/2001 | Wiedeman et al. |
| 6,252,535 B1 | 6/2001 | Kober et al. |
| 6,256,336 B1 | 7/2001 | Rademacher et al. |
| 6,259,688 B1 | 7/2001 | Schilling et al. |
| 6,263,208 B1 | 7/2001 | Chang et al. |
| 6,266,529 B1 | 7/2001 | Chheda |
| 6,275,186 B1 | 8/2001 | Kong |
| 6,278,726 B1 | 8/2001 | Mesecher et al. |
| 6,282,231 B1 | 8/2001 | Norman et al. |
| 6,282,233 B1 | 8/2001 | Yoshida |
| 6,285,316 B1 | 9/2001 | Nir et al. |
| 6,285,319 B1 | 9/2001 | Rose |
| 6,285,861 B1 | 9/2001 | Bonaccorso et al. |
| 6,301,289 B1 | 10/2001 | Bejjani et al. |
| 6,304,618 B1 | 10/2001 | Hafeez et al. |
| 6,308,072 B1 | 10/2001 | Labedz et al. |
| 6,310,704 B1 | 10/2001 | Dogan et al. |
| 6,317,453 B1 | 11/2001 | Chang |
| 6,321,090 B1 | 11/2001 | Soliman |
| 6,324,159 B1 | 11/2001 | Mennekens et al. |
| 6,327,471 B1 | 12/2001 | Song |
| 6,330,460 B1 | 12/2001 | Wong et al. |
| 6,333,947 B1 | 12/2001 | van Heeswyk et al. |
| 6,351,235 B1 | 2/2002 | Stilp |
| 6,351,642 B1 | 2/2002 | Corbett et al. |
| 6,359,874 B1 | 3/2002 | Dent |
| 6,362,760 B2 | 3/2002 | Kober et al. |
| 6,363,104 B1 | 3/2002 | Bottomley |
| 6,377,636 B1 | 4/2002 | Paulraj et al. |
| 6,380,879 B2 | 4/2002 | Kober et al. |
| 6,385,264 B1 | 5/2002 | Terasawa |
| 6,396,804 B2 | 5/2002 | Odenwalder |
| 6,404,760 B1 | 6/2002 | Holtzman et al. |
| 6,430,216 B1 | 8/2002 | Kober et al. |
| 6,459,693 B1 | 10/2002 | Park et al. |
| 6,501,788 B1 | 12/2002 | Wang |
| 6,515,980 B1 | 2/2003 | Bottomley |
| 6,570,909 B1 | 5/2003 | Kansakoski |
| 6,574,270 B1 | 6/2003 | Madkour |
| 6,580,771 B2 | 6/2003 | Kenney |
| 6,584,115 B1 | 6/2003 | Suzuki |
| 6,590,888 B1 | 7/2003 | Ohshima |
| 6,680,727 B2 | 1/2004 | Butler |
| 6,798,737 B1 | 9/2004 | Dabak |
| 6,801,565 B1 | 10/2004 | Bottomley |
| 7,200,133 B2 * | 4/2007 | Lin .................. 370/342 |
| 2001/0003443 A1 | 6/2001 | Velazquez et al. |
| 2001/0020912 A1 | 9/2001 | Naruse et al. |
| 2001/0021646 A1 | 9/2001 | Antonucci et al. |
| 2001/0046266 A1 | 11/2001 | Rakib et al. |
| 2002/0001299 A1 | 1/2002 | Petch et al. |
| 2002/0051433 A1 | 5/2002 | Affes et al. |
| 2002/0172173 A1 | 11/2002 | Schilling et al. |
| 2002/0176488 A1 | 11/2002 | Kober et al. |
| 2003/0053526 A1 | 3/2003 | Reznik |
| 2004/0072553 A1 * | 4/2004 | Wang et al. .................. 455/334 |

| | | | |
|---|---|---|---|
| 2004/0160924 A1* | 8/2004 | Narayan et al. | 370/335 |
| 2005/0123080 A1* | 6/2005 | Narayan et al. | 375/346 |

FOREIGN PATENT DOCUMENTS

| | | |
|---|---|---|
| DE | 4326843 A1 | 2/1995 |
| DE | 4343959 A1 | 6/1995 |
| EP | 0558910 A1 | 1/1993 |
| EP | 0610989 A2 | 1/1994 |
| GB | 2280575 A | 2/1995 |
| JP | 2000-13360 A | 1/2000 |
| WO | WO 93/12590 | 6/1995 |

OTHER PUBLICATIONS

Schneider, Optimum Detection of Code Division Multiplexed Signals, IEEE Transactions on Aerospace and Electronic Systems, Jan. 1979, vol. AES-15 No. 1.

Mitra, et al., Adaptive Receiver Algorithms for Near-Far Resistant CDMA, IEEE Transactions of Communications, Apr. 1995.

Lupas, et al. Near-Far Resistance of Multiuser Detectors in Asynchronous Channels, IEEE Transactions on Communications, Apr. 1990, vol. 38, No. 4.

Lupas, et al., Linear Multiuser Detectors for Synchronous Code-Division Multiple-Access Channels, IEEE Transactions on Information Theory, Jan. 1989, vol. 35, No. 1.

Kohno, et al., Cancellation Techniques of Co-Channel Interference in Asynchronous Spread Spectrum Multiple Access Systems, May 1983, vol. J 56-A. No. 5.

Garg, et al., Wireless and Personal Communications Systems, 1996, pp. 79-151, Prentice Hall, Upper Saddle River, NJ, US.

Cheng, et al., Spread-Spectrum Code Acquisition in the Presence of Doppler Shift and Data Modulation, IEEE Transactions on Communications, Feb. 1990, vol. 38, No. 2.

Behrens et al., Parameter Estimation in the Presence of Low Rank Noise, pp. 341-344, Maple Press, 1988.

Best, Phase-Locked Loops—Design, Simulation, and Applications, pp. 251-287, McGraw-Hill, 1999.

Iltis, Multiuser Detection of Quasisynchronous CDMA Signals Using Linear Decorrelators, IEEE Transactions on Communications, Nov. 1996, vol. 44, No. 11.

Rappaport, Wireless Communications —Principles & Practice, 1996, pp. 518-533, Prentice Hall, Upper Saddle River, NJ, US.

Scharf, et al., Matched Subspace Detectors, IEEE Transactions on Signal Processing, Aug. 1994, vol. 42, No. 8.

Price et al., A Communication Technique for Multipath Channels, Proceedings to the IRE, 1958, vol. 46, The Institute of Radio Engineers, New York, NY, US.

Affes et al., Interference Subspace Rejection: A Framework for Multiuser Detection in Wideband CDMA, IEEE Journal on Selected Areas in Communications, Feb. 2002, vol. 20, No. 2.

Schlegel et al., Coded Asynchronous CDMA and Its Efficient Detection, IEEE Transactions on Information Theory, Nov. 1998, vol. 44, No. 7.

Xie et al., A family of Suboptimum Detectors for Coherent Multiuser Communications, IEEE Journal on Selected Areas in Communications, May 1990, vol. 8, No. 4.

Viterbi, Very Low Rate Convolutional Codes for Maximum Theoretical Performance of Spread Spectrum Multiple-Access Channels, IEEE Journal on Selected Areas in Communications, May 1990, vol. 8, No. 4.

Viterbi, CDMA—Principles of Spread Spectrum Communication, 1995, pp. 11-75 and 179-233, Addison-Wesley, Reading, MA, US.

Verdu, Mimimum Probability of Error for Asynchronous Gaussian Multiple-Access Channels, IEEE Transactions on Information Theory, Jan. 1986, vol. IT-32, No. 1.

Kaplan, Understanding GPS—Principles and Applications, 1996, pp. 83-236, Artech House, Norwood, MA, US.

Scharf, Statistical Signal Processing—Detection, Estimation, and Time Series Analysis, 1990, pp. 23-75 and 103-178, Addison-Wesly, Reading, MA, US.

Stimson, Introduction to Airborne Radar 2nd edition, 1998, pp. 163-176 and 473-491, SciTech Publishing, Mendham, NJ, US.

Behrens et al., Signal Processing Applications of Oblique Projection Operators, IEEE Transactions on Signal Processing, Jun. 1994, vol. 42, No. 6.

Alexander et al, A Linear Receiver for Coded Multiuser CDMA, IEEE Transactions on Communications, May 1997, vol. 45, No. 5.

Schlegel et al., Multiuser Projection Receivers, IEEE Journal on Selected Areas in Communications, Oct. 1996, vol. 14, No. 8.

Halper et al., Digital-to-Analog Conversio n by Pulse-Count Modulation Methods, IEEE Transactions on Instrumentation and M easurement, Aug. 1996, vol. 45, No. 4.

Ortega et al., Analog to Digital and Digital to Analog Conversion Based on Stochastic Logic, IEEE 0-7803-3026-9/95, 1995.

Frankel et al., High-performance photonic analogue digital converter, Electronic Letters, Dec. 4, 1997, vol. 33, No. 25.

Lin et al., Digital Filters for High Performance Audio Delta-sigma Analog-to-digital and Digital-to-analog Conversions, Proceedings of ICSP, Crystal Semiconductor Corporation, 1996, Austin, TX, US.

Thomas, Thesis for the Doctor of Philosophy Degree, UMI Dissertation Services, Jun. 1996, Ann Arbor, MI, US.

Schlegel et al., Projection Receiver: A New Efficient Multi-User Detector, IEEE, 1995, 0-7803-2509-5/95.

Behrens, Subspace Signal Processing in Structed Noise, UMI Dissertation Services, Jun. 1990, Ann Arbor, MI, US.

* cited by examiner

SYSTEMS AND METHODS FOR PARALLEL SIGNAL CANCELLATION

CROSS REFERENCE TO RELATED APPLICATIONS

This application is a continuation-in-part of commonly owned and U.S. patent application Ser. No. 10/773,777 (filed Feb. 06, 2004; the "'777 application") now U.S. Pat. No 7,394,879 which claims benefit of 60/445,243 (filed Feb. 6, 2003) and a CIP of Ser. No. 10/669,954 (filed 5 Sep. 23, 2003; the "'954 application"), and a CIP of Ser. No. 10/686,828 (filed Oct. 15, 2003; the "'828 application"), and a CIP of Ser. No. 10/686,829 (filed Oct. 15, 2003; the "'829 application"), and a CIP of Ser. No. 10/699,360 (filed Oct. 31, 2003; the "'360 application"), and a CIP of Ser. No. 10/294,834 (filed Nov. 15, 2002; the "'834 application"), now U.S. Pat. No 7,200,183 and a CIP of Ser. No. 10/686,359 (filed Oct. 15, 2003; the "'359 application"), now U.S. Pat. No. 7,068,706 and a CIP of Ser. No. 10/763,346 (filed Jan. 23, 2004; the "'346 application"), now U.S. Pat. No. 7,039,136 and TCOM20 (filed Jun. 14, 2004; the "'TCOM20 application"), which are all hereby 10 incorporated by reference. This application is also related to Ser. No. 09/988,219 (filed Nov. 19, 2001; the "'219 application"), which is hereby incorporated by reference.

BACKGROUND

1. Field of the Invention

The invention generally relates to the field of communications. More specifically the invention relates to interference suppression for use in coded signal communications, such as Code Division Multiple Access ("CDMA") communications, Wideband CDMA ("WCDMA") communications, Global Positioning System ("GPS") communications, Broadband CDMA communications, Universal Mobile Telephone Service ("UMTS") communications and combinations thereof.

2. Discussion of the Related Art

In CDMA telephony, coded signals are used to communicate between devices. Some typical CDMA telephony systems use combinations of "spreading codes" and "covering codes" to encode signals. These encoded digital signals are used to convey voice, data and/or other forms of digital communication. As used herein spreading codes are pseudorandom number, or pseudo noise, ("PN") sequence codes and are known to those skilled in the art. As used herein covering codes are orthogonal and/or pseudo-orthogonal codes and are also known those skilled in the art.

A spreading code encodes a data signal by applying a noise-like code sequence to the data at a rate faster than that of the data. Namely, the spreading code is applied to the data such that there are multiple "chips" of the code for any given element of data. Such an application of the spreading code is commonly referred to as direct sequence spreading of the data. A short code is an example of a spreading code. Chips and their associated chip rates are known to those skilled in the art.

A covering code further encodes the signal to provide "channelization" for a signal. For example, each unique covering code as it is applied to a spread signal provides a unique communication channel for the spread signal. This channelization allows a signal to be divided into a number of individual communication channels that may be either shared or assigned to specific users. Covering codes typically include families of codes that are either orthogonal (e.g., Walsh codes) or substantially orthogonal (e.g. Quasi Orthogonal Function, or "QOF" codes).

Interference degrades signal detection and processing capabilities of a receiver by hindering the recovery of a selected signal. While the above-mentioned codes can be used to differentiate signals, interference from unwanted signals is a persistent problem in CDMA communications. For example, interference can be the result of receiving one or more unwanted signals simultaneously with a selected signal. These unwanted signals can be coded signals having properties that are similar to that of the selected signal. Because of code similarities and signal energy, the coded signals often have a tendency to interfere with one another and disrupt the reception of the selected signal. The lack of orthogonality of the received signals results in "leakage" from one signal into another. Examples of such interference include "cross-channel" interference and "co-channel" interference.

Co-channel interference may include multipath interference from the same transmitter, wherein a transmitted signal takes unique paths that causes one path (e.g., an interfering signal path) and another path (e.g., a selected signal path) to differentially arrive at a receiver, thereby hindering reception of the selected path. Cross-channel interference may include interference caused by signal paths of other transmitters hindering the reception of the selected signal path. Such interference can corrupt data as long as it is present in any substantial form.

"Rake" receivers operate in multipath environments that include such interference to improve reception of the selected signal via the combination of signal paths. Rake receivers have a plurality of "fingers," wherein each finger of the rake receiver independently estimates channel gain and other signal characteristics, such as phase, of the selected signal path to more accurately demodulate and subsequently retrieve underlying data of the selected signal by combining multiple copies of the signal. Although rake receivers can improve data retrieval of a received signal, present rake receivers do not reduce cross-channel interference and/or co-channel interference.

SUMMARY

The present invention provides systems and methods for parallel interference suppression. In one embodiment of the invention, a processing engine is used to substantially cancel a plurality of channels corresponding to a plurality of signal paths interfering with a selected signal. The processing engine includes a plurality of matrix generators that are used to generate matrices with each matrix comprising elements of one or more interfering channels of one or more signal paths selected for cancellation. The processing engine also includes one or more processors for using the matrices to generate cancellation operators.

A plurality of applicators applies the cancellation operators in parallel to input signals to substantially cancel the selected interfering signals from the input signals. These input signals may include received signals, interference canceled signals and/or reference codes. The embodiments disclosed herein may be particularly advantageous to systems employing CDMA (e.g., cdmaOne and cdma2000), UMTS, WCDMA, Broadband CDMA and/or GPS signals. Such systems are known to those skilled in the art.

In one embodiment, each cancellation operator is generated from an associated interference matrix constructed from one or more interfering signal paths. Each vector or submatrix of the interference matrix may represent selected channels of a particular path of an interfering signal and can include elements associated with the PN code of the path. Each vector of a matrix may represent a selected channel of a particular interfering path. Further, each channel includes elements associated with the covering code of the channel. In a second embodiment, the matrix may be constructed with one or more composite interference vectors, such as those described in the '360 application. Moreover, the elements of the particular path can have phase, sign information and/or amplitude information associated with the interfering channels for that path imparted on the vector elements. A signal path as used herein generally refers to one or more channels of a signal associated with a particular PN code sequence and/or phase that follow a particular physical path. Such a signal path may have an associated timing alignment in the spreading code due to multipath and/or predetermined offsets of unique CDMA base stations.

In one embodiment of the invention, a processing engine comprises: a plurality of matrix generators, wherein each matrix generator is configured for generating a matrix and wherein each matrix comprises one or more vectors with each vector comprising elements of a signal path selected for cancellation; a processor communicatively coupled to the matrix generators and configured for generating a cancellation operator from each matrix; and a plurality of applicators, wherein each applicator is communicatively coupled to the processor and configured for applying one of the cancellation operators to an input signal to substantially cancel one or more selected channels.

In another embodiment of the invention, the processing engine is configurable with a receiver and wherein the processing engine further comprises a connection element configured for receiving output signals from the applicators and for selecting received said output signals as inputs to processing fingers of the receiver.

In another embodiment of the invention, the connection element comprises a plurality of selectors wherein each selector is configured for receiving one or more of the output signals and for selecting said one of the output signals as one of the inputs to one of the processing fingers.

In another embodiment of the invention, each selector is further configured for receiving a digitized radio signal comprising one or more Code Division Multiple Access signals and for selecting the digitized radio signal as said one of the inputs to said one of the processing fingers.

In another embodiment of the invention, each selector is further configured for receiving a digitized radio signal comprising one or more Wideband Code Division Multiple Access signals and for selecting the digitized radio signal as said one of the inputs to said one of the processing fingers.

In another embodiment of the invention, each selector is further configured for receiving a digitized radio signal comprising one or more Global Positioning System signals and for selecting the digitized radio signal as said one of the inputs to said one of the processing fingers.

In another embodiment of the invention, the output signals comprise interference canceled signals.

In another embodiment of the invention, at least one of the interference canceled signals has selected channels of both a first signal path and a second signal path substantially canceled from the input signal.

In another embodiment of the invention, each cancellation operator is a projection operator configured for projecting a selected signal substantially orthogonal to the selected channels.

In another embodiment of the invention, the projection operator comprises the form:

$$P_s^\perp = I - S(S^T S)^{-1} S^T,$$

where $P_s^\perp$ is the projection operator, I is an identity matrix, S is one of the matrices and $S^T$ is a transpose of said one of the matrices.

In another embodiment of the invention, each application of the cancellation operators comprises the form:

$$y' = y - S(S^T S)^{-1} S^T y,$$

where y' is an output canceled signal, y is a received signal, S is one of the matrices and $S^T$ is a transpose of said one of the matrices.

In another embodiment of the invention, at least one application of the cancellation operators is an approximated projection operation comprising the form:

$$y' \approx y - \sum_{j=1}^{t} \frac{\langle s_j, y \rangle}{\|s_j\|^2} s_j$$

where y' is an output canceled signal, y is a received signal, $s_j$ is the $j^{th}$ h column vector of S and t is the number of vectors in S.

In another embodiment of the invention, the system further comprises an interference selector configured for selecting the signal paths as inputs to the matrix generators.

In another embodiment of the invention, the interference selector is further configured for providing PN codes of the signal paths to the matrix generators.

In another embodiment of the invention, the interference selector selects the signal paths based on a pre-determined criteria selected from a group consisting of amplitude, timing offset and phase.

In another embodiment of the invention, the input signal is a reference PN code.

In another embodiment of the invention, the input signal is a digitized radio signal.

In another embodiment of the invention, each signal path comprises a plurality of channels associated with one timing offset.

In one embodiment of the invention, a method of canceling interference comprises: generating a plurality of matrices, wherein each matrix comprises one or more vectors with each vector comprising elements of a signal path and one or more channels of the signal path selected for cancellation; generating a cancellation operator from each of the matrices; and applying each cancellation operator in parallel to an input signal to substantially cancel one or more selected channels.

In another embodiment of the invention, generating the cancellation operator comprises generating a projection operator having a form:

$$P_s^\perp = I - S(S^T S)^{-1} S^T,$$

where $P_s^\perp$ is the projection operator, I is an identity matrix, S is one of the matrices and $S^T$ is a transpose of said one of the matrices.

In another embodiment of the invention, applying comprises substantially canceling said one or more selected channels according to the form:

$$y' = y - S(S^T S)^{-1} S^T y,$$

where y' is an output canceled signal, y is a received signal, S is one of the matrices and $S^T$ is a transpose of said one of the matrices.

In another embodiment of the invention, the method further comprises selecting the signal paths used in generating the plurality of matrices.

In another embodiment of the invention, the method further comprises providing PN codes of the signal paths to the matrices in response to selecting.

In another embodiment of the invention, the method further comprises selecting the one or more channels used in generating the plurality of matrices.

In another embodiment of the invention, the method further comprises providing selected said one or more channels to the matrices in response to selecting the one or more channels.

In another embodiment of the invention, the method further comprises: selecting output signals generated in response to applying; and assigning the output signals as inputs to processing fingers of a receiver.

In another embodiment of the invention, the method further comprises transferring the output signals to the processing fingers in response to assigning the output signals as said inputs to the processing fingers.

In another embodiment of the invention, selecting the output signals comprises: selecting a first interference canceled output signal for a first of the processing fingers; selecting a second interference canceled output signal for a second of the processing fingers; and selecting a third interference canceled output signal for a third of the processing fingers.

In another embodiment of the invention, the first interference canceled output signal has selected channels of a first signal path substantially canceled from the input signal, wherein the second interference canceled output signal has selected channels of a second signal path substantially canceled from the input signal, and wherein the third interference canceled output signal has selected channels of both the first and the second signal paths substantially canceled from the input signal.

In another embodiment of the invention, the method further comprises receiving a Code Division Multiple Access signal, a Wideband Code Division Multiple Access signal, a Broadband Code Division Multiple Access signal, a Universal Mobile Telephone Service signal and/or a Global Positioning System signal.

In one embodiment of the invention, a system for canceling interference comprises: means for generating a plurality of matrices, wherein each matrix comprises one or more vectors with each vector comprising elements of a signal path and one or more channels of the signal path selected for cancellation; means for generating a cancellation operator from each of the matrices; and means for applying each cancellation operator in parallel to an input signal to substantially cancel one or more selected channels.

In one embodiment of the invention, a mobile handset comprises: a receiver configured for receiving a radio signal; and a processing engine communicatively coupled to the receiver and comprising a plurality of matrix generators, wherein each matrix generator is configured for generating a matrix and wherein each matrix comprises one or more vectors with each vector comprising elements of one or more selected channels of a signal path selected for cancellation, a processor communicatively coupled to the matrix generators and configured for generating a cancellation operator from each matrix, and a plurality of applicators, wherein each applicator is communicatively coupled to the processor and configured for applying one of the cancellation operators to an input signal to substantially cancel one or more selected channels.

In one embodiment of the invention, a connection element comprises: a plurality of selectors, wherein each selector is configured for selecting an input signal to a processing finger, wherein the input signal comprises a digitized radio signal or an interference canceled signal having one or more signal paths canceled.

In another embodiment of the invention, the plurality of selectors is configured with: a first selector selecting a first interference canceled signal for a first processing finger; a second selector selecting a second interference canceled signal for a second processing finger; and a third selector selecting a third interference canceled signal for a third processing finger.

In another embodiment of the invention, a processing engine comprises: a plurality of matrix generators, wherein each matrix generator is configured for generating a matrix and wherein each matrix comprises one or more vectors with each vector comprising elements of a signal path and one or more channels selected for cancellation; a processor communicatively coupled to the matrix generators and configured for generating a cancellation operator from each matrix; and a plurality of applicators, wherein each applicator is communicatively coupled to the processor and configured for applying one of the cancellation operators to an input signal to substantially cancel one or more selected channels, wherein each cancellation operator is a projection operator configured for projecting a selected signal substantially orthogonal to the one or more selected channels.

DETAILED DESCRIPTION OF THE DRAWINGS

Figure 1:
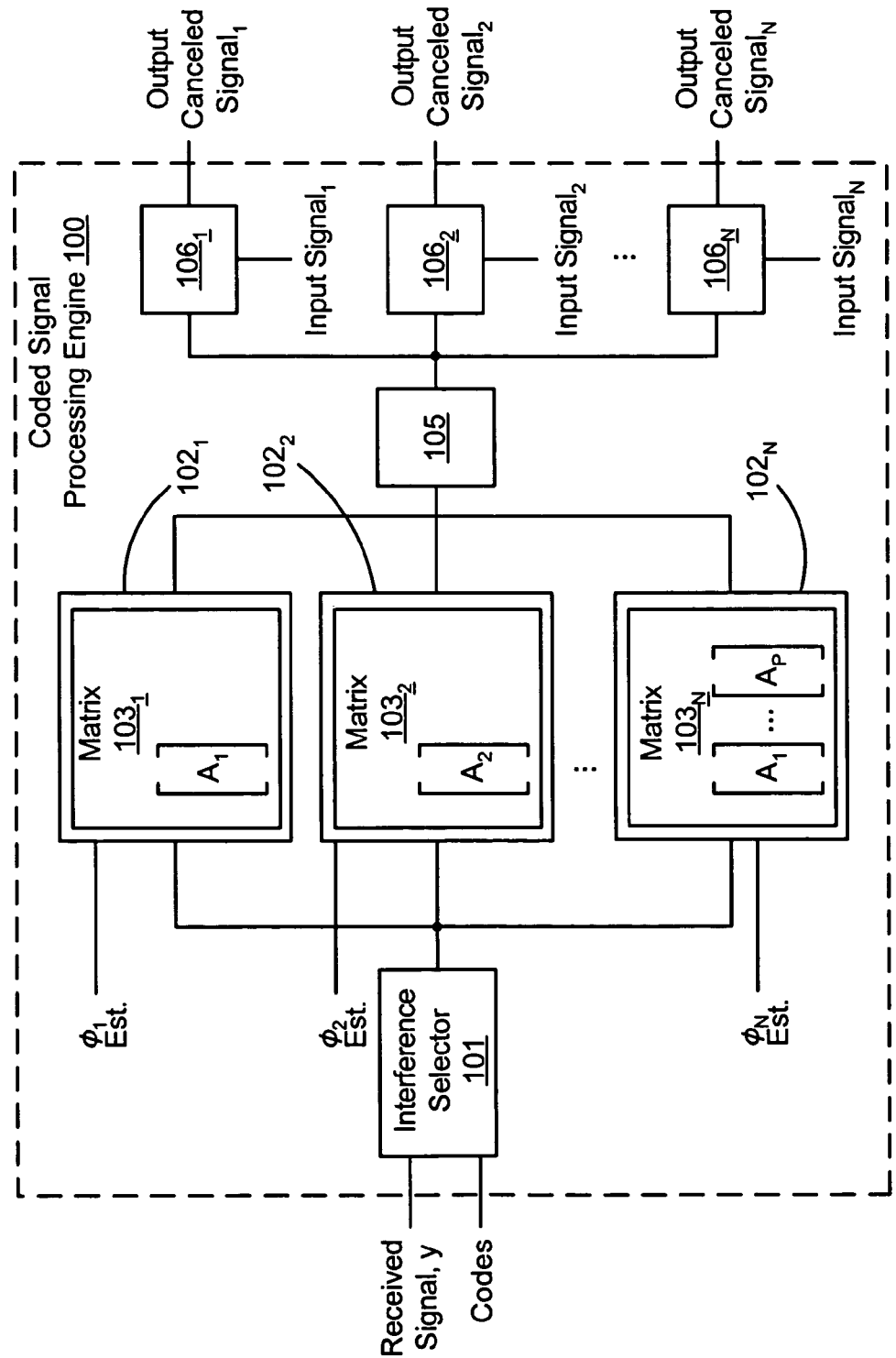
FIG. 1 is a block diagram of an exemplary coded signal processing engine in one embodiment of the invention.

While the invention is susceptible to various modifications and alternative forms, specific embodiments thereof have been shown by way of example in the drawings and are herein described in detail. It should be understood, however, that it is not intended to limit the invention to the particular form disclosed, but rather, the invention is to cover all modifications, equivalents, and alternatives falling within the spirit and scope of the invention as defined by the claims.

FIG. 1 is a block diagram of an exemplary Coded Signal Processing Engine ("CSPE") 100 in one embodiment of the invention. CSPE 100 is used to substantially cancel interfering channels of selected signal paths from a signal. Examples of such interfering signals include co-channel interference and cross-channel interference typical of CDMA communication systems. CSPE 100 substantially cancels selected interfering signals by applying a cancellation operator to either a received signal y or selected coded reference signals x. CSPE 100 generates a plurality of output canceled signals (i.e., labeled Output Canceled Signals$_{1...N}$, where "N" is an integer greater than one), wherein the selected interfering signal paths are substantially removed from the received signal y or the coded reference signals x. The coded reference signals may comprise "on-time" PN codes of signals, covering codes and/or phase estimates that are used for the demodulation of selected signals. On-time as used herein refers to a particular timing alignment for a PN code. Such a timing alignment may correspond to code tracking of a selected signal by a receiver.

In this embodiment, CSPE 100 includes interference selector 101 for selecting interfering signal paths and associated interfering channels. Interference selector 101 may then provide "on-time" interfering PN codes of those selected paths and/or selected channel covering codes to matrix generators 102 (labeled 102$_{1...N}$) of CSPE 100. The interference selector may select the interfering signal paths and channels based on pre-determined criteria, such as amplitude, timing alignment and/or code sequence. Matrix generators 102 may be configured for using the short codes, Walsh codes and/or phase estimates (labeled $\phi_{1...N}$ Est.) of the selected interfering signal paths to generate matrices 103 (labeled matrices 103$_{1...N}$).

Each matrix 103 comprises one or more submatrices A (labeled submatrices A$_{1...P}$). Further, the submatrices A comprise elements representing components of the interfering codes (e.g., such as those elements described in the '346 and the '360 applications). For example, each vector of the submatrix may include elements representing a unique code of an interfering channel of an interfering signal path. A submatrix may be composed of a single vector corresponding to a single channel of one signal path. Alternatively, a single vector may comprise a composite of two or more vectors with each vector representing one interfering channel of a signal path. The composite vector can be formed from a linear combination of two or more vectors with scaling proportional to the amplitude of each signal. The codes are typically on-time PN codes of selected interfering signal paths and corresponding Walsh codes of the selected interfering channels. Each interference vector is multiplied by a phase estimate of the corresponding selected interfering signal path. Phase estimation is exemplified in the '346 application.

As submatrices A may be used to represent multiple interfering signals, each matrix 103 may be representative of a unique plurality of interfering signal paths and their associated interfering channels. For example, A$_1$ may comprise one or more of the selected channels of a first interfering signal path. Matrix 103$_1$ may include a single vector corresponding to one interfering channel of A$_1$. A$_2$ may comprise one or more of the selected channels of a second interfering signal path. Matrix 103$_2$ may include a single vector corresponding to an interfering channel of A$_2$. In one embodiment, a signal path or individual channels of a signal path can be canceled with one or more vectors, wherein each vector comprises elements of an interfering channel or composite elements of multiple channels. Accordingly, matrix 103$_1$ may include a submatrix corresponding to A$_1$, wherein A$_1$ is a plurality of selected channels from the first selected interfering signal path.

A generated matrix 103$_1$ may be used to generate a cancellation operator that substantially cancels A$_1$. Similarly, matrix 103$_2$ may include a submatrix corresponding to A$_2$, wherein A$_2$ is a plurality of selected channels from the second interfering signal path. As such, matrix 103$_2$ may be used to generate a cancellation operator that substantially cancels A$_2$.

As a further illustration, matrix 103$_N$ may include a plurality of submatrices A$_1$...A$_P$, wherein P is an integer greater than one. Each submatrix may correspond to one or more selected channels of selected interfering signal paths (e.g., channels of P signal paths). Such a matrix 103$_N$ may be used to substantially cancel a plurality of submatrices A$_1$...A$_P$.

Alternatively, a vector of a matrix 103 may comprise elements of one or more selected channels of a selected interfering signal path. For example, a vector of matrix 103$_1$ may comprise elements of one or more selected channels of a first signal path. As such, the composite interference vector may allow for the cancellation of the one or more selected channels of the first signal path. Similarly, a vector of matrix 103$_2$ may comprise elements of one or more selected channels of a second signal path. As such, the composite interference vector may allow for the cancellation of the one or more channels of the second signal path. As a further illustration, composite interference vectors may be generated for A$_1$...A$_P$. The matrix 103$_N$ may therefore comprise a plurality of composite interference vectors corresponding to A$_1$...A$_P$. In another embodiment, a vector of matrix 103$_N$ may comprise elements of the one or more selected channels of the one or more selected interfering paths. Composite interference vectors are described and illustrated in further detail in the '834 and the 'TCOM0020 patent applications.

Those skilled in the art should readily recognize that matrices 103 may comprise various combinations of submatrices and/or composite interference vectors. Accordingly, the invention is not intended to be limited to the embodiments shown and described herein. Rather, the invention is only intended to be limited by the claims and their equivalents.

CSPE 100 uses each matrix 103 to generate cancellation operators for selective cancellation of the interfering signals. Accordingly, CSPE 100 includes processor 105 configured for processing matrices 103 to generate the cancellation operators. The cancellation operators may be projection operators that are used to project selected coded signals substantially orthogonal to the interfering signals (e.g., the submatrices A representing the components of the interfering signal paths) so as to substantially cancel or remove the signals from the selected coded signals. For example, processor 105 can use matrices 103 to generate projection operators according to the following form:

$$P_s^\perp = I - S(S^T S)^{-1} S^T, \qquad (Eq. 1)$$

where $P_s^\perp$ is a projection operator, I is an identity matrix, S is an interference matrix 103 and $S^T$ is a transpose of the matrix 103. In this embodiment, the projection operator is applied to the received signal according to the following form:

$$y' = y - S(S^T S)^{-1} S^T y, \qquad (Eq. 2)$$

where y' is the output canceled signal. Such projection operators and their associated constructions are described in the '346, the '360, the '829, the '219 and the '834 applications.

The interference matrix S comprises interference vectors s that are typically not orthogonal. In one embodiment, an approximation of the projection can be generated by assuming that the interference vectors s form an orthogonal set. The projection operator is applied to the received signal according to the following form:

$$y' \approx y - \sum_{j=1}^{t} \frac{\langle s_j, y \rangle}{\|s_j\|^2} s_j \qquad \text{(Eq. 3)}$$

where y' is an output canceled signal, y is a received signal, $s_j$ is $j^{th}$ column vector of S and t is the number of vectors in S.

CSPE 100 applies the cancellation operators to selected input signals (labeled "Input Signal$_{1...N}$") to substantially cancel the interfering signals. CSPE 100 includes a plurality of applicators 106, wherein each applicator 106 (labeled 106$_{1...N}$) applies one of the cancellation operators to an input signal. Each application of a cancellation operator typically provides a unique output canceled signal (labeled "Output Canceled Signal$_{1...N}$"). An output canceled signal as used herein is an input signal to the receiver with one or more selected interfering signal paths substantially removed. For example, using the same signal notations of "A" as described above, applicator 106$_1$ may apply a projection operator $P_{A1}^\perp$ to an input signal. The projection operator $P_{A1}^\perp$, in this example, is generated from a matrix 103 comprising elements of $A_1$. Once applied to the received signal y (i.e., the input signal), applicator 106$_1$ produces an Output Canceled Signal$_1$ that corresponds to $y_{A1}'=P_{A1}^\perp y$, where $y_{A1}'$ is the received signal with $A_1$ substantially removed.

Similarly, applicators 106$_2$ and 106$_N$ may apply projection operators in parallel with applicator 106$_1$ to produce respective unique signals Output Canceled Signal$_2$ and Output Canceled Signal$_N$. For example, applicator 106$_2$ may apply a projection operator $P_{A2}^\perp$ such that the applicator produces an Output Canceled Signal$_2$ corresponding to $y_{A2}'=P_{A2}^\perp y$, where $y_{A2}'$ is the received signal with $A_2$ substantially removed. As another example, applicator 106$_N$ may apply a projection operator $P_{A1...AP}^\perp$ such that the applicator produces Output Canceled Signal$_N$, where the output canceled signal is the result of substantially canceling $A_1...A_P$.

In one embodiment, the projection operators are applied in parallel to reference signals x to produce Output Canceled Signals$_{1...N}$. This application substantially removes components of the selected interferers that lie in the direction of the selected reference signal. Parallel as used herein implies the substantially simultaneous cancellation of one or more channels of one or more signal paths. For example, one or more signal cancellations may be performed at approximately the same time using a plurality of generated projection operators. Generation and/or application timing of these projection operators may vary slightly based on processor capabilities.

While one exemplary embodiment has been shown in detail, the invention is not intended to be limited to the examples described and illustrated herein. For example, applicators 106 may apply cancellation operators to other input signals to produce a variety of unique output canceled signals, such as an output canceled signal input to the CSPE for a subsequent cancellation. Exemplary embodiments wherein the input signal is a received signal y or a coded reference signals x are shown and described in FIGS. 3 and 4, respectively, and again in FIGS. 5 and 6, respectively.

Additionally, the invention is not intended to be limited to the number of applicators 106, input signals, output canceled signals, matrix generators 102 and processors 105 shown and described herein. For example, processor 105 may be either a single processor configured for generating a plurality of cancellation operators or it may represent a plurality of processors, each of which is similarly configured for generating a cancellation operator. Examples of such processors include, but are not limited to, general purpose processors, Application Specific Integrated Circuits ("ASIC"), Digital Signal Processors ("DSP") and Field Programmable Gate Arrays ("FPGA"). Accordingly, the processor may be operably controlled via software, hardware and/or firmware instructions to generate the cancellation operators. Those skilled in the art are familiar with processors, ASICs, DSPs and FPGAs, software, hardware, firmware and the various combinations thereof, which may be used implement the embodiments described herein. Moreover, those skilled in the art should readily recognize that the described CSPE 100 as well may be implemented in software, firmware, hardware and/or various combinations thereof.

Figure 2:
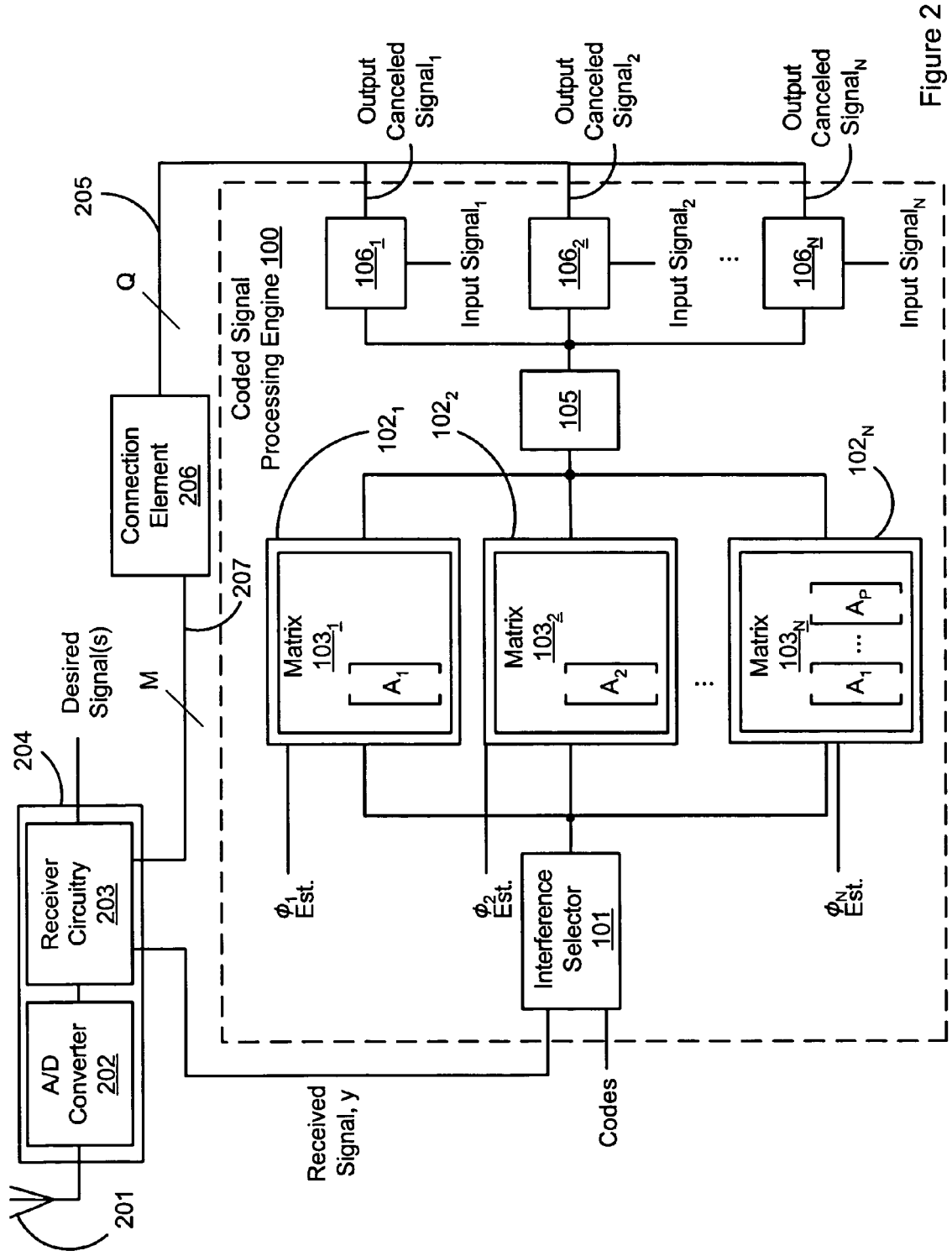
FIG. 2 is a block diagram of the exemplary coded signal processing engine configurable with a receiver in one embodiment of the invention.

FIG. 2 is a block diagram of the exemplary CSPE 100 of FIG. 1 configurable with receiver 204 in one embodiment of the invention. In this embodiment, receiver 204 receives a radio frequency ("RF") signal through antenna 201 and subsequently converts that signal to a digital received signal y using Analog-to-Digital ("A/D") converter 202. A/D converter 202 transfers the digital signal to receiver circuitry 203 for signal processing. In one embodiment, the received signal y comprises a plurality of CDMA signals. Those skilled in the art should readily recognize that the processing of CDMA signals may include both In-phase ("I") and Quadrature ("Q") components.

In this embodiment, receiver circuitry 203 is configured for transferring the digitized received signal y to CSPE 100 for cancellation of components of interfering signal paths. CSPE 100 receives the signal y as well as codes corresponding to the interfering signals. For example, the interfering signal paths may be cross channel and/or co-channel interferers comprising known codes of CDMA communication systems, e.g. spreading and covering codes. Such codes may be input to CSPE 100 on an as needed basis or stored with a memory (not shown) local to CSPE 100. Alternatively, the codes may be generated by interference selector 101 on an as needed basis.

Operable characteristics of CSPE 100 are the same as those described in FIG. 1. For example, CSPE 100 uses applicators 106$_{1...N}$ to apply cancellation operators to the input signals to substantially cancel interfering signal paths from an input signal. In one embodiment, the applicators 106$_{1...N}$, using the same signal notations of "A" as described above, produce output canceled signals as follows:

Applicator 106$_1$ produces an Output Canceled Signal$_1$ that corresponds to $y_{A1}'=P_{A1}^\perp y$, where again $y_{A1}'$ is the received signal with $A_1$ substantially removed;

Applicator 106$_2$ produces an Output Canceled Signal$_2$ corresponding to $y_{A2}'=P_{A2}^\perp y$, where again $y_{A2}'$ is the received signal with $A_2$ substantially removed; and Applicator 106$_N$ produces an Output Canceled Signal$_N$ corresponding to $y_{AN}'=P_{A1...AP}^\perp y$; where $y_A'$ is the received signal with $A_1...A_P$ substantially removed.

These Output Canceled Signals$_{1...N}$ are transferred to connection element 206 via "R" channel connection 205. R channel connection 205 may be a communicative connection such as a data bus that allows for the transfer of "R" number of channels to connection element 206. The number of channels "R" that are transferred via connection 205 may be greater than or equal to the number of output canceled signals generated by CSPE 100. Connection element 206 may, therefore, be configurable to receive such an "R" channel connection.

Connection element 206 is configured for selectively transferring signals (e.g., Output Canceled Signals$_{1...N}$) to receiver circuitry 203 of receiver 204 via "M" channel connection 207. For example, connection element 206 may be a switching device, multiplexer, a plurality of multiplexers or another similar communication device that selectively transfers "R" number of signals to "M" number of channels. For example, "R" number of signals may correspond to N output canceled signals and some number of uncancelled signals. Similar to "R", "M" channel connection 207 may be a communicative connection such as a data bus that allows for the transfer of "M" number of channels from connection element 206. In one preferred embodiment, the connection element 206 is communicatively coupled with M processing fingers in the receiver.

The control for connection element 206 may be applied independently of cancellation processing. Consequently, connection element 206 may either be configured within CSPE 100 or external to the CSPE. For example, should selected reception of Output Canceled Signals$_{1...N}$ be decided by receiver 204, then connection element 206 may reside outside of the embodied CSPE 100. In a preferred embodiment, CSPE 100 includes the control functionality for connection element 206 that determines which of the Output Canceled Signals$_{1...N}$ are transferred to receiver circuitry 203. However, the invention should not be limited to the preferred embodiment described and shown herein.

Figure 3:
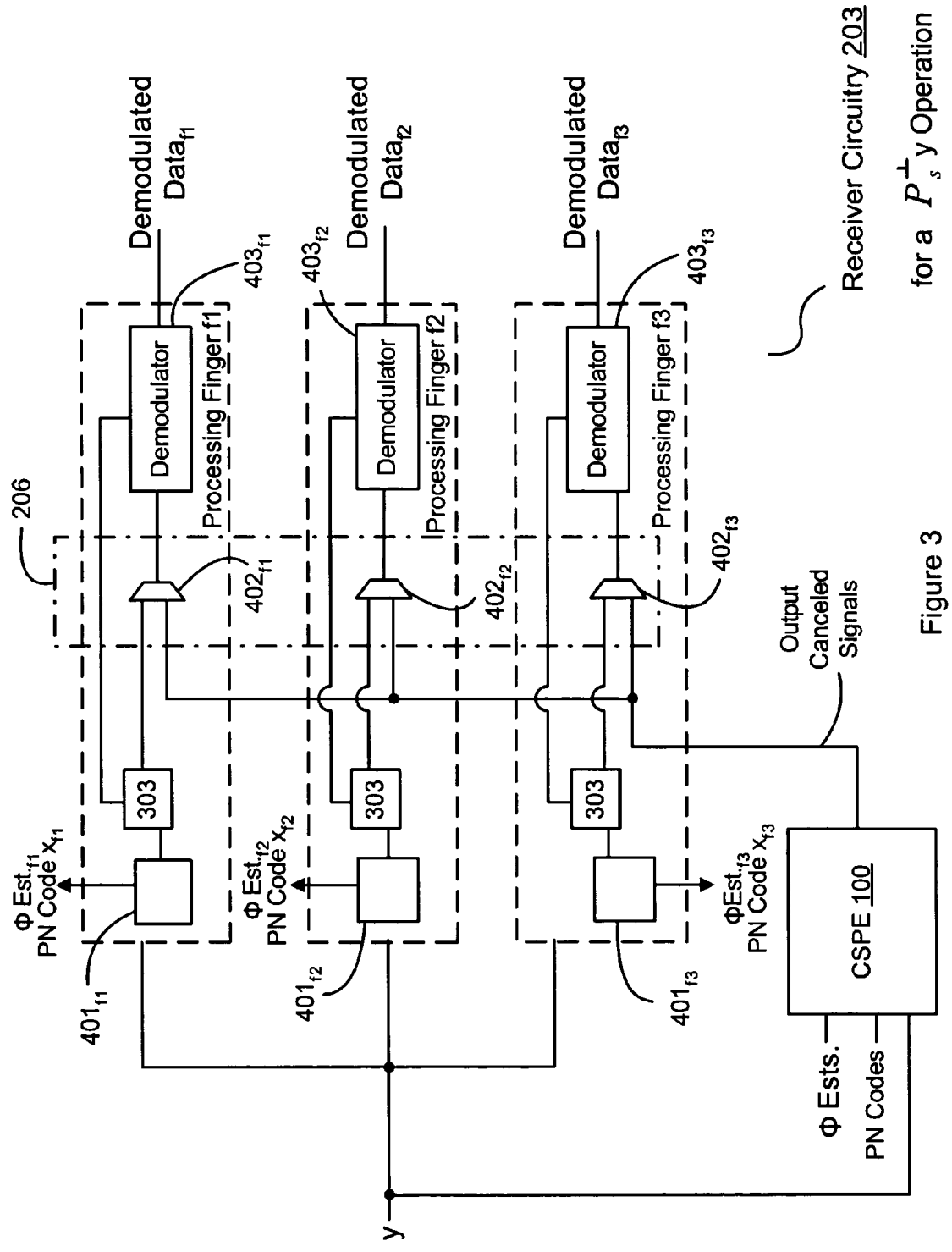
FIG. 3 is a block diagram of exemplary receiver circuitry.

FIG. 3 is a block diagram of exemplary receiver circuitry 203. In this embodiment, receiver circuitry 203 is configured with CSPE 100 via connection element 206 for selectively tracking and demodulating signals through processing fingers f1, f2 and f3. For example, connection element 206 may allow the receiver circuitry 203 to demodulate a selected combination of Output Canceled Signals$_{1...N}$ and/or the received signal y through the demodulators 403 (labeled 403$_{f1...f3}$) of processing fingers f1, f2 and f3.

In an exemplary embodiment, a first processing finger f1 receives a signal y. A tracking element 401$_{f1}$ of finger f1 produces a phase estimate $\phi_{f1}$ and the on-time PN code $x_{f1}$ of an assigned signal. The phase estimate $\phi_{f1}$ and the on-time PN code $x_{f1}$ of the first processing finger f1 are transferred from the finger to CSPE 100 for producing the output canceled signal $y_{A1}'$ described in FIGS. 1 and 2. Alternatively, the estimation of phase may be performed in the CSPE 100.

The tracking element 401$_{f1}$ transfers the signal y and the on-time PN code $x_{f1}$ with the phase estimate $\phi_{f1}$ to delay element 303. The delay element 303 may be implemented by a buffer or some other well known device to compensate for any delays introduced by the signal processing of CSPE 100. Typically, such delays are on the order of one or more symbols. The delay element 303 transfers the on-time PN code $x_{f1}$ with the phase estimate $\phi_{f1}$ to demodulator 403$_{f1}$. Additionally, the delay element 303 transfers the on-time PN code $x_{f1}$ delayed signal y to the selector 402$_{f1}$. Accordingly, demodulator 403$_{f1}$, using the delayed on-time PN code $x_{f1}$, demodulates either the delayed received signal y or an output canceled signal from CSPE 100 as selected by selector 402$_{f1}$. Such demodulation may provide interference canceled demodulated data$_{f1}$.

A second processing finger f2 similarly tracks and demodulates a second assigned signal. For example, the assigned signal is tracked in 401$_{f2}$ thereby producing a phase estimate $\phi_{f2}$ and the on-time PN Code $x_{f2}$ of the assigned signal. The phase estimate $\phi_{f2}$ and the on-time PN Code $x_{f2}$ are also transferred to CSPE 100 to generate output canceled signal $y_{A2}'$. The demodulator 403$_{f2}$ selectively receives either the delayed signal y or output canceled signal $y_{A1}'$ via a corresponding selector 402$_{f2}$ for the demodulation of the assigned signal using the delayed on-time PN code $x_{f2}$. This demodulation may provide interference canceled demodulated data$_{f2}$.

The third processing finger may operate similarly by demodulating either the delayed received signal y or an output canceled signal that may have a plurality of interfering signals canceled (e.g., Output Canceled Signal$_3$, wherein $A_1$ and $A_2$, or some combination thereof, are substantially canceled). The third processing finger may, therefore, receive an interference canceled signal without the interfering effects of $A_1$ and/or $A_2$.

While one embodiment has been shown and described herein, the embodiment should not be limited to the number of processing fingers shown and described. Nor should the embodiment be limited to the number of cancellations referenced. More processing fingers than those of this exemplary embodiment may be used to selectively track and demodulate signals according to the principles described and illustrated herein. Again, phase estimation as described herein is described and shown in further detail in the '346 application.

Figure 4:
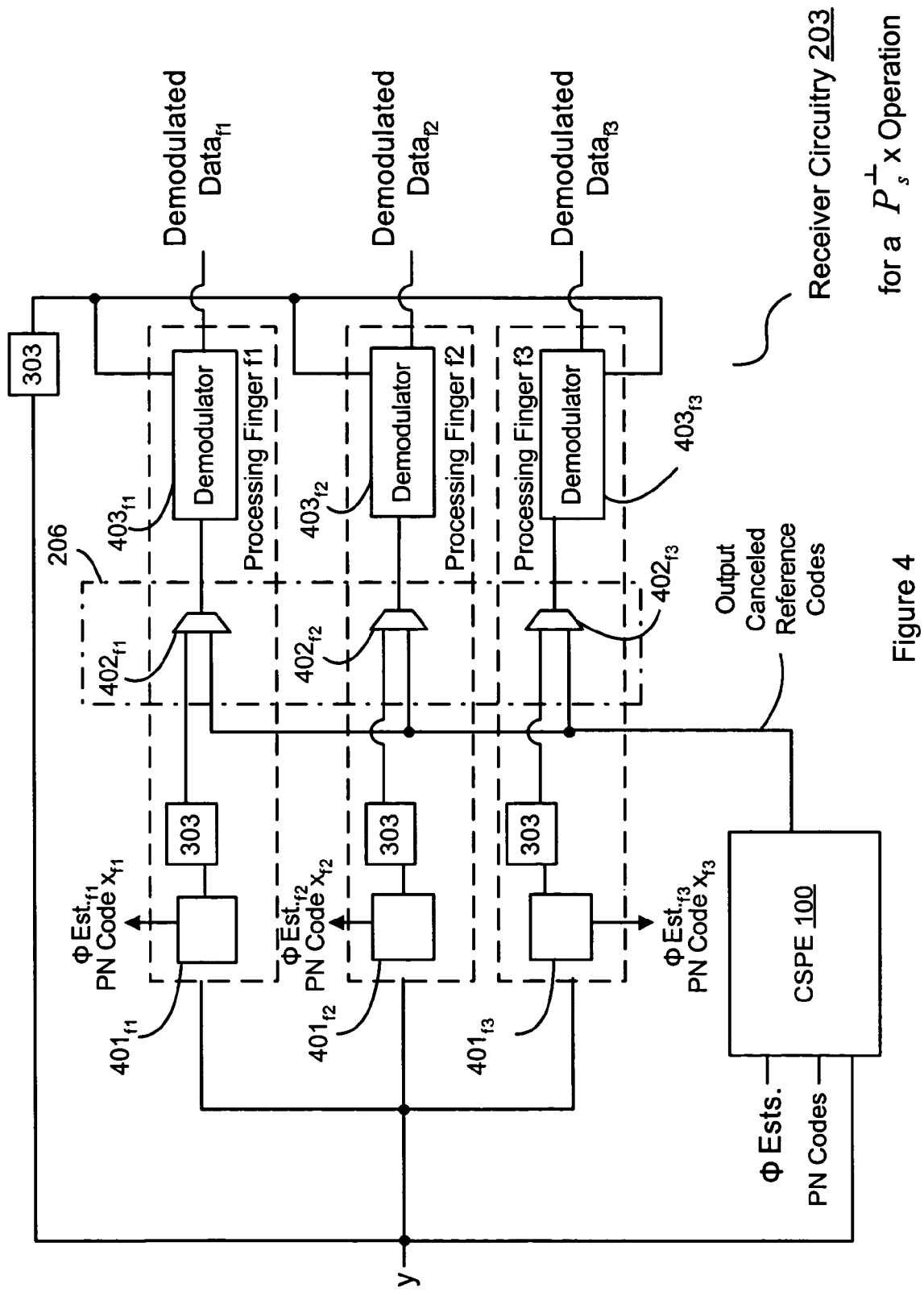
FIG. 4 is another block diagram of exemplary receiver circuitry.

FIG. 4 is another block diagram of exemplary receiver circuitry 203. In this alternative embodiment, receiver circuitry 203 is configured for demodulating signals using output canceled reference codes. As shown, a signal y is transferred to processing fingers f1, f2 and f3 and CSPE 100. Time tracking and phase estimation of the signal y may be performed for each finger in corresponding elements 401$_{f1...f3}$. Such tracking and phase estimation are again used to generate corresponding on-time reference PN codes $x_{f1...f3}$ and the phase estimates $\phi_{f1...f3}$.

Elements 401$_{f1...f3}$ transfer the on-time reference PN codes $x_{f1...f3}$ and possibly the phase estimates $\phi_{f1...f3}$ to CSPE 100 for use in generating output canceled reference codes. For example, CSPE 100 uses these on-time reference PN codes $x_{f1...f3}$ and phase estimates $\phi_{f1...f3}$ to generate cancellation operators that remove interfering signals from reference codes x. The cancellation operators are applied to the on-time reference PN codes $x_{f1...f3}$ to generate output canceled versions of the codes The on-time PN codes and phase estimates may also be transferred to corresponding delay element 303 to delay the codes and phase estimates to compensate for any delay introduced by CSPE 100. Delay element 303 of a receiver finger may transfer the delayed reference PN code to a corresponding selector 402 of connection element 206. Delay element 303 of a receiver may transfer the delayed phase estimate to a demodulator 403. Again, delay element 303 may be implemented by a buffer or some other well known device to compensate for CSPE introduced delays. The delayed reference PN code and phase estimate may selectively be used by a corresponding demodulator to demodulate a signal from the received signal y.

For example, CSPE 100 in this embodiment uses the applicators 106 of FIGS. 1 and 2 to apply cancellation operators to the on-time reference PN codes thereby producing output canceled versions of the codes (e.g., output canceled reference codes $x_{A1}'...x_{A3}'$). Such an embodiment may result in a cancellation of the form $P_s^{-1}x$. These output canceled reference PN codes are selectively transferred to demodulators 403$_{f1...f3}$ via selectors 402$_{f1...f3}$ of connection element 206. These codes may be used by the demodulators 403$_{f1...f3}$ to demodulate the signal y delayed by delay element 303. The delay of 303 may again be used to compensate for any delays introduced by CSPE 100. The demodulation in demodulators 403$_{f1...f3}$ may be performed with a correlation of a reference code and the received signal y over a symbol period with appropriate phase adjustment. Such demodulation is well known to those skilled in the art.

In a preferred embodiment, tracking element 401$_{f1}$ of processing finger f1 produces the on-time reference code $x_{f1}$ and the phase estimate $\phi_{f1}$. The reference code $x_{f1}$ and phase estimate $\phi_{f1}$ are delayed by delay element 303 and transferred to the demodulator $403_{f1}$ n via the selector $402_{f1}$ n of connection element 206. The first finger f1 then demodulates the delayed signal y using the code $x_{f1}$ and phase estimate $\phi_{f1}$. In this embodiment, CSPE 100 may use reference code $x_{f1}$ and/or phase estimate $\phi_{f1}$, to generate a set of Output Canceled Reference Codes $\{x_{A1}'\}$, wherein the set $\{x_{A1}'\}$ comprises, for example, the output canceled on-time reference PN codes for receiver fingers f2 and f3 with the interfering effects of A1 substantially removed.

A demodulator $403_{f2}$ of processing finger f2 selectively receives either $x_{f2}$ or the $x_{A1}'$ corresponding to f2 via corresponding selector $402_{f2}$ for demodulation. Similarly, CSPE 100 may use reference code $x_{f2}$ and/or phase estimate $\phi_{f2}$ (e.g., provided by tracking element $401_{f2}$) to generate a set of Output Canceled Reference Codes $\{x_{A2}'\}$, wherein the set $\{x_{A2}'\}$ comprises, for example, the output canceled on-time reference PN codes for receiver fingers f1 and f3 with the interfering effects of A2 substantially removed. CSPE 100 may also use reference codes $x_{f1}$ and $x_{f2}$ and/or respective phase estimates $\phi_{f1}$ and $\phi_{f2}$ to generate a set of Output Canceled Reference Codes $\{x_{A1A2}'\}$, wherein the set $\{x_{A1A2}'\}$ comprises, for example, the output canceled on-time reference PN code for receiver finger f3 with the interfering effects of A1 and A2 substantially removed.

A demodulator $403_{f3}$ of processing finger f3 selectively receives either $x_{f3}$ or one of the $x_{A1}'$, $x_{A2}'$ or $x_{A1A2}'$ corresponding to f3 via corresponding selector $402_{f3}$ for demodulation. For example, CSPE 100 may use reference code $x_{f3}$ and/or phase estimate $\phi_{f3}$ (e.g., provided by tracking element $401_{f3}$) to generate a set of Output Canceled Reference Codes $\{x_{A3}'\}$, wherein the set $\{x_{A3}'\}$ comprises, for example, the output canceled on-time reference PN codes for receiver fingers f1 and f2 with the interfering effects of A3 substantially removed. Similarly, CSPE 100 may also use reference codes $x_{f1}$, $x_{f2}$ and/or $x_{f3}$ (e.g., with or without respective phase estimates $\phi_{f1}$, $\phi_{f2}$ and $\phi_{f3}$) to generate one or more sets of Output Canceled Reference Codes $\{x_{A1A3}'\}$, $\{x_{A2A3}'\}$ and/or $\{x_{A3}'\}$, wherein the sets comprise, for example, the output canceled on-time reference PN codes for receiver fingers f1 and f2 with the interfering effects of A1 and/or A2 substantially removed.

While one embodiment has been shown and described herein, the embodiment should not be limited to the number of processing fingers shown and described. Nor should the embodiment be limited to the number of cancellations referenced. More processing fingers than those of this exemplary embodiment may be used to selectively track and demodulate signals according to the principles described and illustrated herein. Additionally, any processing finger shown and described herein may provide an on-time reference PN code output associated with an interfering signal path. In other embodiments, however, the on-time reference PN code outputs are generated from within CSPE 100.

Figure 5:
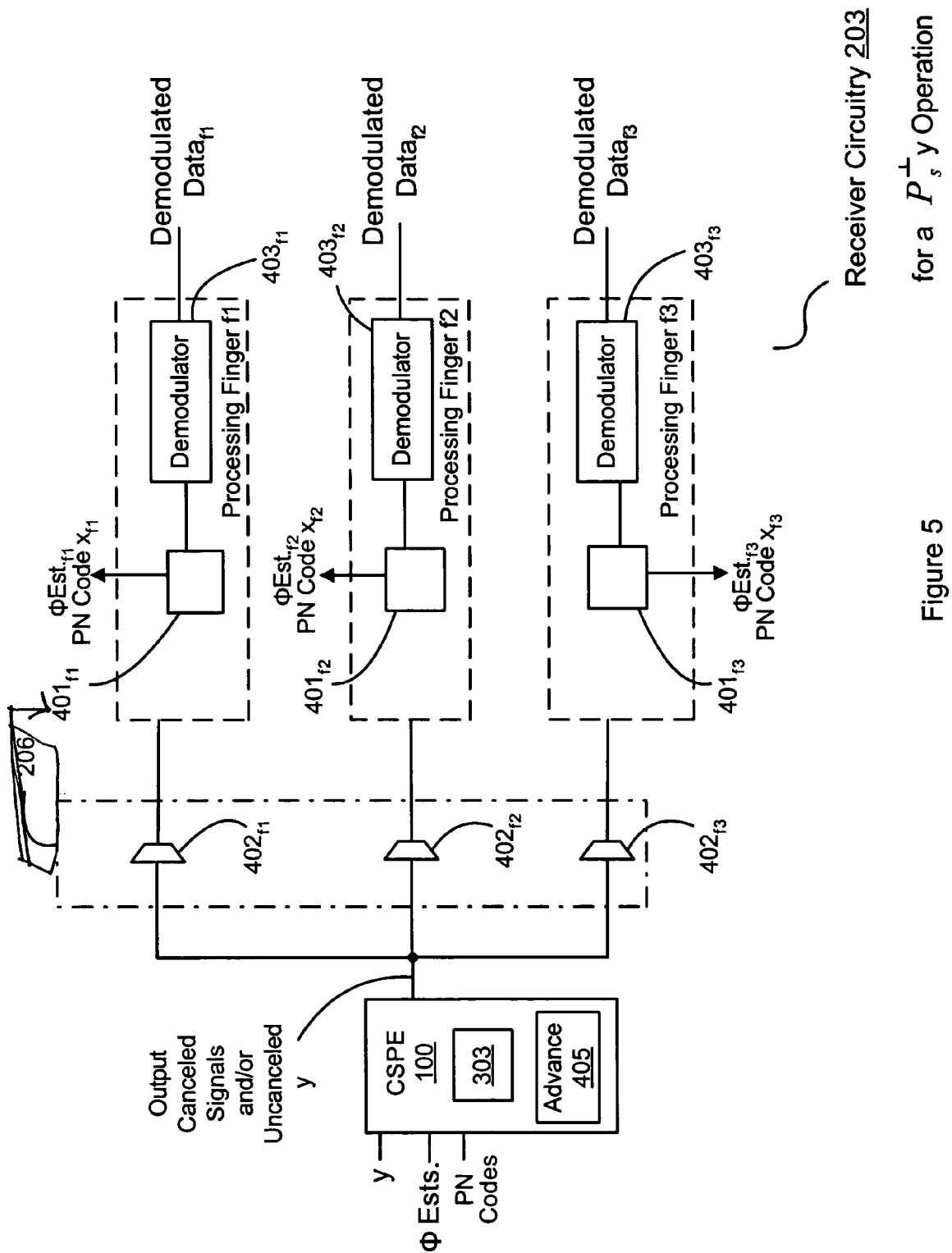
FIG. 5 is another block diagram of exemplary receiver circuitry.

FIG. 5 is another block diagram of exemplary receiver circuitry 203 comprising processing fingers f1, f2 and f3. In this alternative embodiment, receiver circuitry 203 is configured for demodulating signals using output canceled received signals. As shown, a signal y is transferred to CSPE 100. Time tracking and phase estimation of signals tracked by processing fingers f1, f2 and f3 may be input to CSPE 100 as well. CSPE 100 outputs interference canceled received signals and/or an uncanceled received signal (i.e., the signal y without cancellation performed thereon).

The canceled and uncanceled signals are time-aligned at the output of CSPE 100 through the implementation of delay element 303 that delays the uncanceled signals by a duration introduced by the processing of canceled signals by CSPE 100. The canceled and uncanceled signals are transferred to selectors 402 of connection element 206 for selected transfer to processing fingers f1, f2 and/or f3. Each tracking element 401 tracks the signal path assigned to a processing finger and produces a phase estimate and on-time PN code for the signal path.

For each processing finger, the on-time PN code and the phase estimate of the signal path are transferred back to CSPE 100 for use in interference selection. Since the on-time PN code is delayed in alignment relative to the received signal y input to CSPE 100 (i.e., because of the delay introduced by CSPE 100), the on-time PN code is advanced in advance element 405 by a duration substantially equal to the delay introduced by CSPE 100 processing. Since PN code tracking and phase estimation is performed on a delayed signal input to a processor, the phase and on-time PN code is estimated by a duration equivalent to the delay introduced by CSPE 100. However, a stationary phase estimate may be made in which the phase is assumed to be constant for the duration of processing multiple symbols by CSPE 100. For example, a two-symbol delay in the CSPE 100 results in advance element 405 advancing the on-time PN code by two symbols. The advanced on-time PN code is then input to CSPE 100 to selectively perform cancellation.

Figure 6:
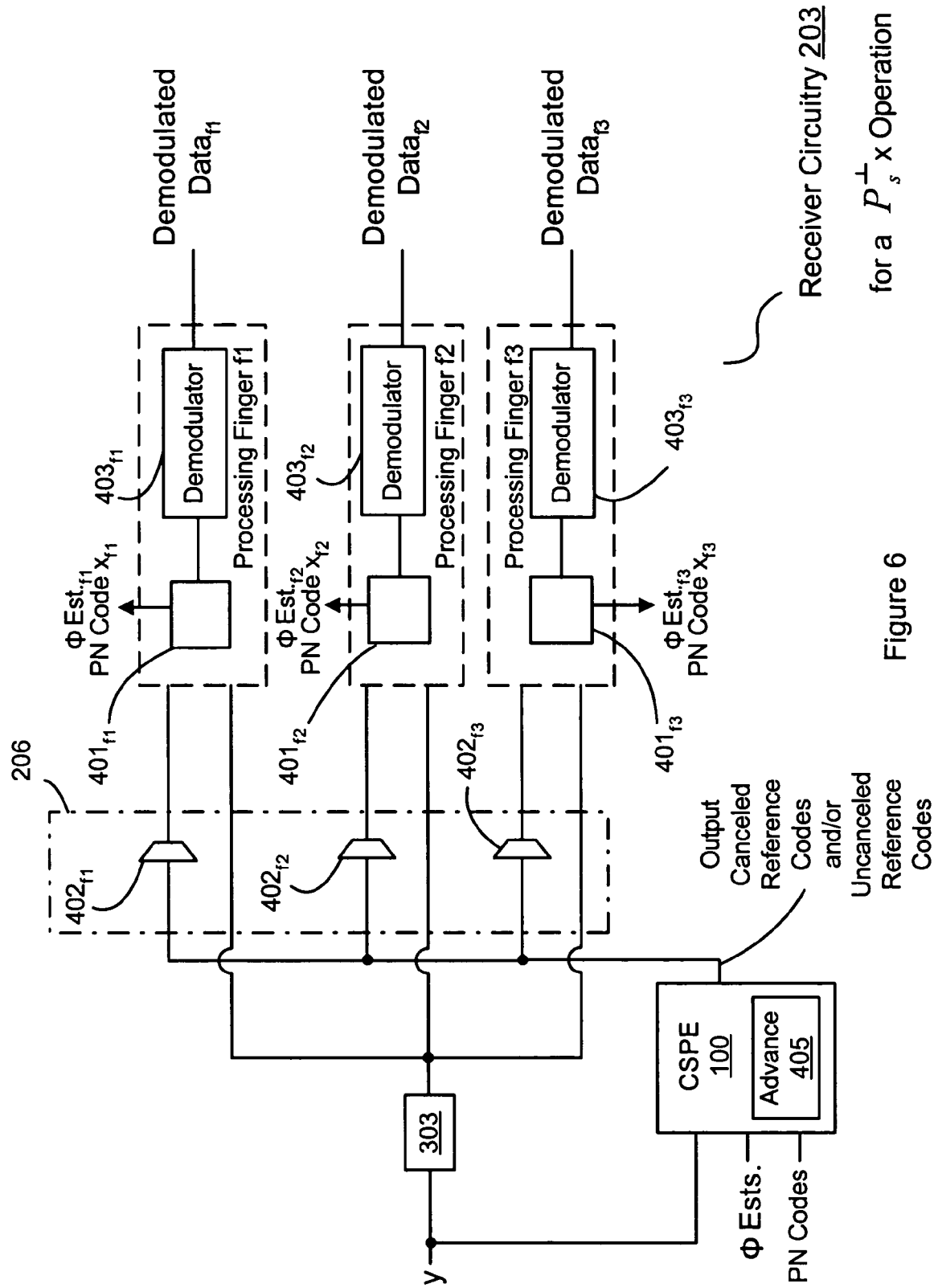
FIG. 6 is another block diagram of exemplary receiver circuitry.

FIG. 6 is another block diagram of exemplary receiver circuitry 203. In this alternative embodiment, receiver circuitry 203 is configured for demodulating signals using output canceled reference codes. The received signal y is transferred to CSPE 100 and, via delay block 303, to the processing fingers. The delay of delay block 303 is substantially equivalent to the processing delay introduced by CSPE 100. Alternatively, the received signal y may be transferred to the processing fingers f1 . . . f3 via CSPE 100. CSPE 100 receives or calculates on-time PN codes and phase estimates of the signals that may be selected for cancellation. CSPE 100 applies a cancellation operator to selected reference codes, which are subsequently output to the processing fingers via selectors 402 of connection element 206.

In one exemplary embodiment, three canceled reference codes may be required for each processing finger processing an output canceled reference code. The canceled reference codes may be produced by an application of a single cancellation operator to a reference PN code. The canceled reference codes may consist of early, late and prompt PN codes where the prompt PN refers to the on-time PN code and the early and late PN codes are advanced and delayed versions of the prompt PN code, respectively. These PN codes for a given finger may be transferred via selector 402 to the processing finger. Tracking element 401 may utilize the early and late PN codes for tracking of the canceled signal. The prompt PN code may be used for phase estimation in the corresponding tracking element 401 and for demodulation in the corresponding demodulator 403 (labeled $403_{f1 \ldots f3}$). Early, late and prompt PN codes are well known to those skilled in the art.

In another exemplary embodiment, the processing finger may receive a longer interference canceled PN code sequence that comprises three overlapping reference codes (i.e., early, late and prompt). For example, if the PN codes are L samples in length and the offset between the prompt PN code and the early and late PN codes is 4 samples then the longer interference canceled PN code sequence is L+8 samples in length. The early PN code sequence comprises samples 1 through L, the prompt PN code comprises samples 5 through L+4 and the late PN code comprises samples 9 through L+8 of the longer interference canceled PN code sequence. The early, prompt and late reference codes are then used by tracking element 401 for tracking of the selected signal as is known to those skilled in the art.

Tracking element 401 performs tracking on the assigned signal utilizing either uncanceled generated PN codes or output canceled PN codes. A phase estimate and on-time reference code is output from the tracking element 401. The on-time reference code is advanced via advance element 405 by an amount equivalent to the delay of the CSPE 100. This advanced on-time reference code and phase estimate are then input to CSPE 100 to perform interference cancellation.

Figure 7:
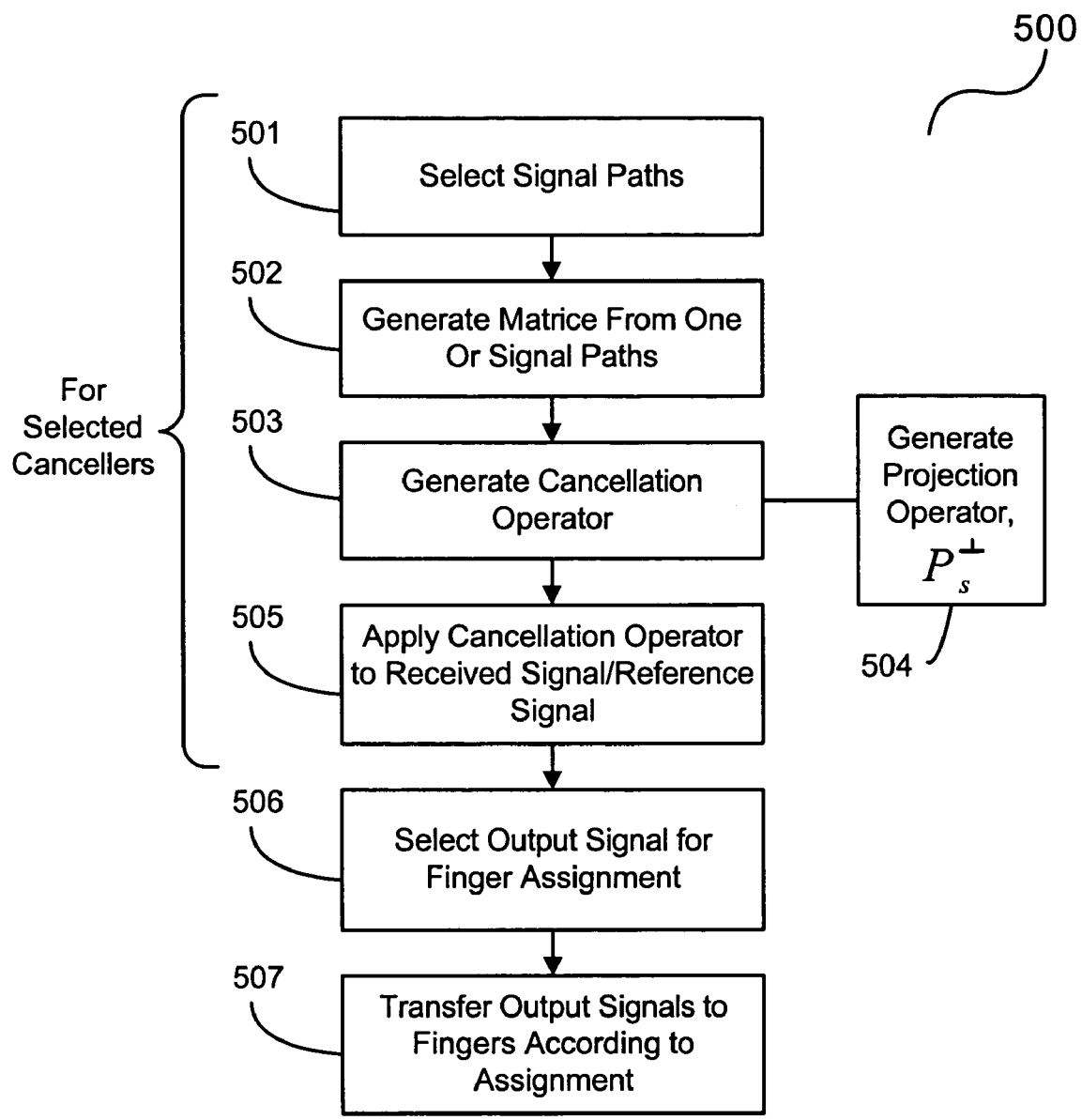
FIG. 7 is a flow chart illustrating one exemplary methodical embodiment of the invention.

FIG. 7 is a flow chart 500 illustrating one exemplary methodical embodiment of the invention. In this embodiment, interfering signal paths and associated channels of a received signal are selected, in element 501. One or more of these interfering signal paths are used to generate an interference matrix, in element 502. A cancellation operator is generated from the interference matrix, in element 503. The cancellation operator may be a projection operator as described in FIG. 1 that is generated in element 504 to project a received signal or a reference signal onto a subspace that is substantially orthogonal to the one or more interfering signals. Such a projection operator may substantially cancel or remove the interfering signals from the received signal or the reference signal. The cancellation operator is applied to either the received signal or an on-time reference code, in element 505.

Elements 501 through 505 may be performed in parallel based on the number of cancellations, such as those shown and described in CSPE 100 of FIG. 2. Moreover, control functionality may be configured to only select particular signal paths and channels from fingers. For example, if a signal does not contribute significantly to the interference, it may be selectively excluded from the cancellation process to decrease the amount of processing and to reduce the effects of noise. Such a selection process is described in the '954 application.

The application of the cancellation operators in element 505 produces output canceled signals such as those described herein. Once those output canceled signals are produced, the signals may be selected for finger assignment, in element 506. Such a selection process may be performed by connection element 206 in FIG. 3. Selected output canceled signals are transferred to the tracking and/or demodulation portion of the processing fingers according to their respective finger assignments, in element 507. Within their respective fingers, the output canceled signals are used to track and/or demodulate a selected signal as in FIGS. 3, 4, 5 and 6.

The exemplary embodiments shown and described in FIGS. 3, 4, 5 and 6 illustrate a receiver with a plurality of processing fingers. Those skilled in the art should readily recognize that the receiver, however, is not intended to be limited to the exemplary embodiment. Rather, the number of processing fingers employed within the receiver may be determined as a matter of design choice.

The embodiments described herein may substantially reduce interference caused by unwanted signals and improve signal processing. For example, poor signal quality due to interference may deleteriously affect acquisition, tracking and demodulation of selected signals. A reduction in interference may, therefore, result in improved signal recovery of the selected signals. In regards to such benefits, the embodiments herein may advantageously require use within a CDMA telephony system. Improved processing within a CDMA telephony system may be exploited in terms of increased system capacity, transmit power reduction, increased system coverage and/or increased data rates. However, those skilled in the art should readily recognize that the above embodiments should not be limited to any particular method of signaling. For example, the embodiments disclosed herein may also be advantageous to systems employing CDMA (e.g., such as cdmaOne and cdma2000), WCDMA, Broadband CDMA, UMTS and GPS signals.

Additionally, it should be noted that the above embodiments of the invention may be implemented in a variety of ways. For example, the above embodiments may be implemented in software, firmware, hardware or various combinations thereof. Those skilled in the art are familiar with software, firmware, hardware and their various combinations. To illustrate, those skilled in the art may choose to implement certain aspects of the invention in hardware using ASIC chips, FPGAs, DSPs and/or other integrated circuitry (e.g., custom designed circuitry). Still, some aspects of the invention may be implemented through combinations of software using Java, C, C++, Matlab, Verilog, VHDL, and/or processor specific machine and assembly languages. Accordingly, those skilled in the art should readily recognize that such implementations are a matter of design choice and that the invention should not be limited to any particular implementation.

While the invention has been illustrated and described in detail in the drawings and foregoing description, such illustration and description is to be considered as exemplary and not restrictive in character. Accordingly, it should be understood that only the preferred embodiment and minor variants thereof have been shown and described and that all changes and modifications that come within the spirit of the invention are desired to be protected.

What is claimed is:

1. A processing engine, comprising:
a plurality of matrix generators, wherein each matrix generator is configured for generating a matrix and wherein each matrix comprises one or more vectors with each vector comprising elements of a signal path selected for cancellation;
a processor communicatively coupled to the matrix generators and configured for generating a cancellation operator from each matrix; and
a plurality of applicators, wherein each applicator is communicatively coupled to the processor and configured for applying one or more of the cancellation operators in parallel to an input signal to substantially cancel one or more selected channels.

2. The processing engine of claim 1, wherein the processing engine is configurable with a receiver and wherein the processing engine further comprises a connection element configured for receiving output signals from the applicators and for selecting received said output signals as inputs to processing fingers of the receiver.

3. The processing engine of claim 2, wherein the connection element comprises a plurality of selectors wherein each selector is configured for receiving one or more of the output signals and for selecting said one of the output signals as one of the inputs to one of the processing fingers.

4. The processing engine of claim 3, wherein each selector is further configured for receiving a digitized radio signal comprising one or more Code Division Multiple Access signals and for selecting the digitized radio signal as said one of the inputs to said one of the processing fingers.

5. The processing engine of claim 3, wherein each selector is further configured for receiving a digitized radio signal comprising one or more Wideband Code Division Multiple Access signals and for selecting the digitized radio signal as said one of the inputs to said one of the processing fingers.

6. The processing engine of claim 3, wherein each selector is further configured for receiving a digitized radio signal comprising one or more Global Positioning System signals and for selecting the digitized radio signal as said one of the inputs to said one of the processing fingers.

7. The processing engine of claim 3, wherein the output signals comprise substantially interference canceled signals.

8. The processing engine of claim 7, wherein at least one of the substantially interference canceled signals has selected channels of both a first signal path and a second signal path substantially canceled from the input signal.

9. The processing engine of claim 1, wherein each cancellation operator is a projection operator configured for projecting a signal substantially orthogonal to the selected channels.

10. The processing engine of claim 9, wherein the projection operator comprises the form:

$$P_s^\perp = I - S(S^T S)^{-1} S^T,$$

where $P_s^\perp$ is the projection operator, I is an identity matrix, S is one of the matrices and $S^T$ is a transpose of S.

11. The processing engine of claim 1, wherein each application of the cancellation operators comprises the form:

$$y' = y - S(S^T S)^{-1} S^T y,$$

where y' is an output canceled signal, y is a received signal, S is one of the matrices and $S^T$ is a transpose of S.

12. The processing engine of claim 1, at least one application of the cancellation operators is an approximated projection operation comprising the form:

$$y' \approx y - \sum_{j=1}^{t} \frac{\langle s_j, y \rangle}{\|s_j\|^2} s_j$$

where y' is an output canceled signal, y is a received signal, $s_j$ is the $J^{th}$ column vector of S and t is the number of vectors in S.

13. The processing engine of claim 1, further comprising an interference selector configured for selecting the signal paths as inputs to the matrix generators.

14. The processing engine of claim 13, wherein the interference selector is further configured for selecting one or more channels of the signal paths for cancellation.

15. The processing engine of claim 13, wherein the interference selector is further configured for providing PN codes of the signal paths to the matrix generators.

16. The processing engine of claim 13, wherein the interference selector selects the signal paths based on a pre-determined criteria selected from a group consisting of amplitude, timing offset and phase.

17. The processing engine of claim 1, wherein the input signal is a reference PN code.

18. The processing engine of claim 1, wherein the input signal is a digitized radio signal.

19. The processing engine of claim 1, wherein each signal path comprises a plurality of channels associated with one PN code.

20. A method of canceling interference, comprising:
generating a plurality of matrices, wherein each matrix comprises one or more vectors with each vector comprising elements of a signal path and one or more channels of the signal path selected for cancellation;
generating one or more cancellation operators from each of the matrices; and
applying each cancellation operator in parallel to an input signal to substantially cancel one or more selected channels.

21. The method of claim 20, wherein generating the cancellation operator comprises generating a projection operator having a form:

$$P_s^\perp = I - S(S^T S)^{-1} S^T,$$

where $P_s^\perp$ is the projection operator, I is an identity matrix, S is one of the matrices and $S^T$ is a transpose of S.

22. The method of claim 20, wherein applying comprises substantially canceling said one or more selected signals according to the form:

$$y' = y - S(S^T S)^{-1} S^T y,$$

where y' is an output canceled signal, y is a received signal, S is one of the matrices and $S^T$ is a transpose of S.

23. The method of claim 20, wherein applying results in an approximated projection operation comprising the form:

$$y' \approx y - \sum_{j=1}^{t} \frac{\langle s_j, y \rangle}{\|s_j\|^2} s_j$$

where y' is an output canceled signal, y is a received signal, $s_j$ is the $J^{th}$ column vector of S and t is the number of vectors in S.

24. The method of claim 20, further comprising selecting the signal paths used in generating the plurality of matrices according to a predetermined criteria.

25. The method of claim 24, further comprising providing PN codes of the signal paths to the matrices in response to selecting the signal paths.

26. The method of claim 24, further comprising selecting the one or more channels used in generating the plurality of matrices according to a predetermined criteria.

27. The method of claim 26, further comprising providing selected said one or more channels to the matrices in response to selecting the one or more channels.

28. The method of claim 20, further comprising:
selecting output signals generated in response to applying; and
assigning the output signals as inputs to processing fingers of a receiver.

29. The method of claim 28, further comprising transferring the output signals to the processing fingers in response to assigning the output signals as said inputs to the processing fingers.

30. The method of claim 28, wherein the output signals comprise substantially interference canceled signals.

31. The method of claim 30, wherein at least one of the substantially interference canceled signals has selected channels of both a first signal path and a second signal path substantially canceled from the input signal.

32. The method of claim 28, wherein selecting the output signals comprises:
selecting a first substantially interference canceled output signal for a first of the processing fingers;
selecting a second substantially interference canceled output signal for a second of the processing fingers; and
selecting a third substantially interference canceled output signal for a third of the processing fingers.

33. The method of claim 32, wherein the first substantially interference canceled output signal has selected channels of a first signal path substantially canceled from the input signal, wherein the second substantially interference canceled output signal has selected channels of a second signal path substantially canceled from the input signal, and wherein the third substantially interference canceled output signal has selected channels of both the first and the second signal paths substantially canceled from the input signal.

34. The method of claim 20, further comprising receiving a Code Division Multiple Access signal from which a signal path or channel is selected.

35. The method of claim 20, further comprising receiving a Wideband Code Division Multiple Access signal from which a signal path or channel is selected.

36. The method of claim 20, further comprising receiving a Global Positioning System signal from which a signal path or channel is selected.

37. The method of claim 20, wherein the input signal comprises a reference PN code.

38. The method of claim 20, wherein the input signal is a digitized radio signal.

39. The method of claim 20, wherein each signal path comprises a plurality of channels associated with one PN code.

40. A system for canceling interference, comprising:
means for generating a plurality of matrices, wherein each matrix comprises one or more vectors with each vector comprising elements of a signal path and one or more channels of the signal path selected for cancellation;
means for generating a cancellation operator from each of the matrices; and
means for applying one or more cancellation operators in parallel to an input signal to substantially cancel one or more selected channels.

41. The system of claim 40, wherein the means for generating the cancellation operator comprises means for generating a projection operator having a form:

$$P_s^\perp = I - S(S^T S)^{-1} S^T,$$

where $P_s^\perp$ is the projection operator, I is an identity matrix, S is one of the matrices and $S^T$ is a transpose of S.

42. The system of claim 40, wherein the means for applying comprises means for substantially canceling said one or more selected channels according to the form:

$$y' = y - S(S^T S)^{-1} S^T y,$$

where y' is an output canceled signal, y is a received signal, S is one of the matrices and $S^T$ is a transpose of S.

43. The system of claim 40, wherein the means for applying results in an approximated projection operation comprising the form:

$$y' \approx y - \sum_{j=1}^{t} \frac{\langle s_j, y \rangle}{\|s_j\|^2} s_j$$

where y' is an output canceled signal, y is a received signal, $s_j$ is the $J^{th}$ column vector of S and t is the number of vectors in S.

44. The system of claim 40, further comprising means for selecting the signal paths used in generating the plurality of matrices.

45. The system of claim 44, further comprising means for providing PN codes of the signal paths to the matrices in response to selecting.

46. The system of claim 44, further comprising means for selecting the one or more channels used in generating the plurality of matrices.

47. The system of claim 46, further comprising means for providing selected said one or more channels to the matrices in response to selecting the one or more channels.

48. The system of claim 40, further comprising:
means for selecting output signals generated in response to applying; and
means for assigning the output signals as inputs to processing fingers of a receiver.

49. The system of claim 48, further comprising means for transferring the output signals to the processing fingers in response to assigning the output signals as said inputs to the processing fingers.

50. The system of claim 48, wherein the output signals comprise substantially interference canceled signals.

51. The system of claim 50, wherein at least one of the substantially interference canceled signals has selected channels of both a first signal path and a second signal path substantially canceled from the input signal.

52. The system of claim 48, wherein the means for selecting the output signals comprises:
means for selecting a first substantially interference canceled output signal for a first of the processing fingers;
means for selecting a second substantially interference canceled output signal for a second of the processing fingers; and
means for selecting a third substantially interference canceled output signal for a third of the processing fingers.

53. The system of claim 52, wherein the first substantially interference canceled output signal has selected channels of a first signal path substantially canceled from the input signal, wherein the second substantially interference canceled output signal has selected channels of a second signal path substantially canceled from the input signal, and wherein the third substantially interference canceled output signal has selected channels of both the first and the second signal paths substantially canceled from the input signal.

54. The system of claim 40, further comprising means for receiving a Code Division Multiple Access signal from which a signal path or channel is selected.

55. The system of claim 40, further comprising means for receiving a Wideband Code Division Multiple Access signal from which a signal path or channel is selected.

56. The system of claim 40, further comprising means for receiving a Global Positioning System signal from which a signal path or channel is selected.

57. The system of claim 40, wherein the input signal comprises a reference PN code.

58. The system of claim 40, wherein the input signal is a digitized radio signal.

59. The system of claim 40, wherein each signal path comprises a plurality of channels associated with one PN code.

60. A mobile handset, comprising:
a receiver configured for receiving a radio signal; and
a processing engine communicatively coupled to the receiver and comprising
a plurality of matrix generators, wherein each matrix generator is configured for generating a matrix and wherein each matrix comprises one or more vectors with each vector comprising elements of one or more selected channels of a signal path selected for cancellation, a processor communicatively coupled to the matrix generators and configured for generating one or more cancellation operators from each matrix, and a plurality of applicators, wherein each applicator is communicatively coupled to the processor and configured for applying one or more of the cancellation operators to an input signal to substantially cancel one or more selected channels.

61. The mobile handset of claim 60, wherein the processing engine further comprises a connection element configured for receiving output signals from the applicators and for selecting received said output signals as inputs to processing fingers of the receiver.

62. The mobile handset of claim 61, wherein the connection element comprises a plurality of selectors wherein each selector is configured for receiving one or more of the output signals and for selecting said one of the output signals as one of the inputs to one of the processing fingers.

63. The mobile handset of claim 62, wherein each selector is further configured for receiving a digitized radio signal comprising one or more Code Division Multiple Access signals and for selecting the digitized radio signal as said one of the inputs to said one of the processing fingers.

64. The mobile handset of claim 62, wherein each selector is further configured for receiving a digitized radio signal comprising one or more Wideband Code Division Multiple Access signals and for selecting the digitized radio signal as said one of the inputs to said one of the processing fingers.

65. The mobile handset of claim 62, wherein each selector is further configured for receiving a digitized radio signal comprising one or more Global Positioning System signals and for selecting the digitized radio signal as said one of the inputs to said one of the processing fingers.

66. The mobile handset of claim 62, wherein the output signals comprise substantially interference canceled signals.

67. The mobile handset of claim 66, wherein at least one of the substantially interference canceled signals has selected channels of both a first signal path and a second signal path substantially canceled from the input signal.

68. The mobile handset of claim 60, wherein each cancellation operator is a projection operator configured for projecting a signal substantially orthogonal to the one or more selected channels.

69. The mobile handset of claim 68, wherein the projection operator comprises the form:

$$P_s^\perp = I - S(S^T S)^{-1} S^T,$$

where $P_s^\perp$ is the projection operator, I is an identity matrix, S is one of the matrices and $S^T$ is a transpose of S.

70. The mobile handset of claim 60, wherein each application of the cancellation operators comprises the form:

$$y' = y - S(S^T S)^{-1} S^T y,$$

where y' is an output canceled signal, y is a received signal, S is one of the matrices and $S^T$ is a transpose of S.

71. The mobile handset of claim 60, at least one application of the cancellation operators is an approximated projection operation comprising the form:

$$y' \approx y - \sum_{j=1}^{t} \frac{\langle s_j, y \rangle}{\|s_j\|^2} s_j$$

where y' is an output canceled signal, y is a received signal, $s_j$ is the $J^{th}$ column vector of S and t is the number of vectors in S.

72. The mobile handset of claim 60, further comprising an interference selector configured for selecting the signal paths as inputs to the matrix generators.

73. The mobile handset of claim 72, wherein the interference selector is further configured for providing PN codes of the signal paths to the matrix generators.

74. The mobile handset of claim 72, wherein the interference selector selects the signal paths based on a pre-determined criteria selected from a group consisting of amplitude, timing offset and phase.

75. The mobile handset of claim 72, wherein the interference selector is further configured for selecting interfering channels as inputs to the matrix generators.

76. The mobile handset of claim 60, wherein the input signal is a reference PN code.

77. The mobile handset of claim 60, wherein the input signal is a digitized radio signal.

78. The mobile handset of claim 60, wherein each signal path comprises one or more channels associated with one PN code.

79. A processing engine, comprising:
a plurality of matrix generators, wherein each matrix generator is configured for generating a matrix and wherein each matrix comprises one or more vectors with each vector comprising elements of a signal path and one or more channels selected for cancellation;

a processor communicatively coupled to the matrix generators and configured for generating a cancellation operator from each matrix; and a plurality of applicators, wherein each applicator is communicatively coupled to the processor and configured for applying one of the cancellation operators to an input signal to substantially cancel one or more selected channels, wherein each cancellation operator is a projection operator configured for projecting a selected signal substantially orthogonal to the one or more selected channels.

80. The processing engine of claim 79, wherein the processing engine is configurable with a receiver and wherein the processing engine further comprises a connection element configured for receiving output signals from the applicators and for selecting received said output signals as inputs to processing fingers of the receiver.

81. The processing engine of claim 80, wherein the connection element comprises a plurality of selectors wherein each selector is configured for receiving one or more of the output signals and for selecting said one of the output signals as one of the inputs to one of the processing fingers.

82. The processing engine of claim 81, wherein each selector is further configured for receiving a digitized radio signal comprising one or more Code Division Multiple Access signals and for selecting the digitized radio signal as said one of the inputs to said one of the processing fingers.

83. The processing engine of claim 81, wherein each selector is further configured for receiving a digitized radio signal comprising one or more Wideband Code Division Multiple Access signals and for selecting the digitized radio signal as said one of the inputs to said one of the processing fingers.

84. The processing engine of claim 81, wherein each selector is further configured for receiving a digitized radio signal comprising one or more Global Positioning System signals and for selecting the digitized radio signal as said one of the inputs to said one of the processing fingers.

85. The processing engine of claim 81, wherein the output signals comprise substantially interference canceled signals.

86. The processing engine of claim 85, wherein at least one of the substantially interference canceled signals has selected channels of both a first signal path and a second signal path substantially canceled from the input signal.

87. The processing engine of claim 79, wherein the projection operator comprises the form:

$$P_s^\perp = I - S(S^TS)^{-1}S^T,$$

where $P_s^\perp$ is the projection operator, I is an identity matrix, S is one of the matrices and $S^T$ is a transpose of S.

88. The processing engine of claim 79, wherein each application of the cancellation operators comprises the form:

$$y' = y - S(S^TS)^{-1}S^Ty,$$

where y' is an output canceled signal, y is a received signal, S is one of the matrices and $S^T$ is a transpose of S.

89. The processing engine of claim 79, at least one application of the cancellation operators is an approximated projection operation comprising the form:

$$y' \approx y - \sum_{j=1}^{t} \frac{\langle s_j, y \rangle}{\|s_j\|^2} s_j$$

where y' is an output canceled signal, y is a received signal, $s_j$ is the $j^{th}$ column vector of S and t is the number of vectors in S.

90. The processing engine of claim 79, further comprising an interference selector configured for selecting the signal paths as inputs to the matrix generators.

91. The processing engine of claim 90, wherein the interference selector is further configured for providing PN codes of the signal paths to the matrix generators.

92. The processing engine of claim 90, wherein the interference selector selects the signal paths based on a pre-determined criteria selected from a group consisting of amplitude, timing offset and phase.

93. The processing engine of claim 90, wherein the interference selector is further configured for selecting channels as inputs to the matrix generators.

94. The processing engine of claim 79, wherein the input signal is a reference PN code.

95. The processing engine of claim 79, wherein the input signal is a digitized radio signal.

96. The processing engine of claim 79, wherein each signal path comprises one or more channels associated with one PN code.

* * * * *